United States Patent
Hori et al.

(10) Patent No.: US 8,934,140 B2
(45) Date of Patent: Jan. 13, 2015

(54) IMAGE PROCESSING APPARATUS AND IMAGE PROCESSING METHOD

(75) Inventors: Ayumi Hori, Kawasaki (JP); Fumihiro Goto, Kawasaki (JP); Yusuke Hashii, Kawasaki (JP); Tetsuya Suwa, Yokohama (JP); Fumitaka Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1811 days.

(21) Appl. No.: 12/056,451

(22) Filed: Mar. 27, 2008

(65) Prior Publication Data

US 2008/0239353 A1    Oct. 2, 2008

(30) Foreign Application Priority Data

Mar. 30, 2007   (JP) ................................. 2007-093550

(51) Int. Cl.
G06K 15/02      (2006.01)
H04N 1/409      (2006.01)
H04N 1/60       (2006.01)
G06K 9/44       (2006.01)

(52) U.S. Cl.
CPC ..................... H04N 1/6058 (2013.01)
USPC ........... 358/2.1; 358/1.9; 358/3.24; 358/3.26; 358/3.27; 358/501; 358/518; 358/530; 358/448; 382/173; 382/162; 382/164; 382/165; 382/166; 382/167

(58) Field of Classification Search
USPC ........ 358/2.1, 1.9, 3.24, 3.26, 3.27, 501, 518, 358/530, 448; 382/173, 162, 164, 165, 166, 382/167
See application file for complete search history.

(56) References Cited

U.S. PATENT DOCUMENTS

| 5,270,808 | A  | * | 12/1993 | Tanioka ........................ 358/527 |
| 5,594,807 | A  | * | 1/1997  | Liu ............................... 382/128 |
| 5,729,360 | A  | * | 3/1998  | Kita et al. ..................... 358/500 |
| 5,793,501 | A  | * | 8/1998  | Murakami ..................... 358/520 |
| 6,108,441 | A  | * | 8/2000  | Hiratsuka et al. ............. 382/167 |
| 6,560,356 | B1 | * | 5/2003  | Takahashi et al. ............ 382/162 |
| 6,927,877 | B2 | * | 8/2005  | Kanno et al. .................. 358/3.1 |
| 7,009,734 | B2 |   | 3/2006  | Suwa et al. .................... 358/1.9 |
| 7,016,530 | B2 |   | 3/2006  | Saito et al. .................... 382/162 |
| 7,075,679 | B2 |   | 7/2006  | Goto et al. .................... 358/3.01 |
| 7,274,491 | B2 |   | 9/2007  | Yamada et al. ............... 358/3.06 |

(Continued)

FOREIGN PATENT DOCUMENTS

| EP | 0 969 413 A2  | 1/2000 |
| JP | 2000-022973 A | 1/2000 |

(Continued)

*Primary Examiner* — Beniyam Menberu
(74) *Attorney, Agent, or Firm* — Fitzpatrick, Cella, Harper & Scinto

(57) ABSTRACT

A color gamut of image data is appropriately subjected to a smoothing processing to print an image of favorable color reproduction and gradation reproduction. Specifically, when an average lightness is equal to or lower than a blacking lightness, the object pixel is not subjected to the smoothing processing. This can conserve the signal value of the object pixel to prevent a pixel originally having a signal value higher than the blacking lightness from being converted by the gamut compression to a black point. In this manner, a pixel for which the object pixel has the average lightness equal to or lower than the blacking lightness is blacked and a pixel having a signal value higher than the blacking lightness is not compressed to the black point. The resultant image has no deteriorated gradation characteristic when being macroscopically observed.

26 Claims, 20 Drawing Sheets

(56) References Cited

U.S. PATENT DOCUMENTS

| | | | |
|---|---|---|---|
| 7,542,167 B2 * | 6/2009 | Ito et al. | 358/1.9 |
| 8,103,119 B2 * | 1/2012 | Kuniba | 382/274 |
| 2003/0081831 A1 * | 5/2003 | Fukao et al. | 382/167 |
| 2003/0214661 A1 * | 11/2003 | Kondo | 358/1.9 |
| 2005/0271295 A1 * | 12/2005 | Tabata et al. | 382/274 |
| 2006/0232620 A1 * | 10/2006 | Kitamura et al. | 347/15 |
| 2006/0245002 A1 * | 11/2006 | Kita | 358/3.26 |
| 2006/0245016 A1 * | 11/2006 | Fukao et al. | 358/518 |
| 2007/0030498 A1 | 2/2007 | Hori et al. | 358/1.9 |
| 2007/0030499 A1 | 2/2007 | Hori | 358/1.9 |
| 2008/0002901 A1 | 1/2008 | Miyagi et al. | 382/260 |

FOREIGN PATENT DOCUMENTS

| | | |
|---|---|---|
| JP | 2001-251513 A | 9/2001 |
| JP | 2002-218271 A | 8/2002 |

* cited by examiner

IMAGE PROCESSING APPARATUS AND IMAGE PROCESSING METHOD

BACKGROUND OF THE INVENTION

1. Field of the Invention

The present invention relates to an image processing apparatus and an image processing method. In particular, the present invention relates to an application of a smoothing processing to an image and manner of the application.

2. Description of the Related Art

Recently, multi function machines including an ink jet print type printing mechanism and a scanner mechanism (hereinafter also referred to as IJMFP) have been widely provided. IJMFP is a printer that can be connected to a personal computer (PC) to provide various applications such as a function to perform printing and scanning, a copy function of the machine itself, and a function by which the machine is connected to a digital camera for direct printing. Thus, the multi function machines have been used as a copying machine for family use for example. The copy function of IJMFP reads a document image by a scanner mechanism to print the image on a printing medium such as a paper.

In the copying as described above, the color reproduction range and the like is generally different depending on the type of a document to be copied. Thus, there may be a case where the document and a copy output have difficulty in having identical visual colors. There may be another case where different gradation characteristics may be reproduced depending on the type of a document.

Difference in document is caused, for example, between when a print printed by a printer is copied and when a silver halide photograph is copied. Specifically, a printer performs are production of an image by an area coverage modulation in which printing is performed on a printing medium based on quantized data to provide the print whose gradation is expressed by the area coverage modulation such as a halftone dot document. On the other hand, silver halide photography performs a reproduction of an image by a density modulation in which gradation is expressed by the density itself. If a read image is subjected to a uniform processing and printing is performed based on the uniform processing result regardless of whether the document is based on the area coverage modulation or the density modulation, a problem may be caused where how a base color changes or a color is reproduced is different depending on the type of a document.

To solve this problem, Japanese Patent Laid-Open No. 2001-251513 proposes a technique using image region segmentation. Specifically, this publication describes a method for segmenting a read image to at least a halftone dot region and a photo region and subjecting the respective regions to optimal γ conversions to provide favorable images in all regions. Also, Japanese Patent Laid-Open No. 2002-218271 describes a method for similarly segmenting a read image to a character region and a photograph region and subjecting the respective regions to optimal color space conversions to provide favorable images in all regions.

However, in the case of the above-described methods of Japanese Patent Laid-Open No. 2001-251513 and Japanese Patent Laid-Open No. 2002-218271, the respective regions subjected to the image region segmentation are subjected to optimal color conversions. Thus, for each of the segmented regions, a color design must be performed in accordance with the output characteristic of the printer. In this case, an accurate color reproduction requires increased types of regions subjected to the image region segmentation. For example, halftone dot regions require different output characteristics of the printer depending on the number of lines and a screen angle. Thus, regions must be segmented to the number of regions in accordance with these printer output characteristics. Because of this, the color conversion processing for the respective regions requires an increased amount of processing to consequently require a significant amount of memory.

In the meantime, smoothing processing can basically provide an effective measure against the above-described problem where a different color or gradation is reproduced dependent on the type of the document. Specifically, an image may be subjected to the smoothing processing to provide, in the subsequent color conversion processing, a certain color or gradation, which is shown in the image finally printed based on the reading result, regardless of the type of the document. The reason will be briefly described below.

FIG. 1 is a graph showing color differences, as the maximum color difference and an average color difference, between an image printed without subjecting an image read by a scanner to the smoothing processing and an image printed with subjecting the read image to the smoothing processing. In particular, FIG. 1 shows resultant color differences between respective sets of 729 color patches each set of which is made by combining respective nine levels of colors of R, G, and B and which are printed by respective three types of print methods of the offset printing, the silver halide photography, and the ink jet photograph printing (hereinafter IJ photograph printing). As can be seen from FIG. 1, those subjected to the smoothing processing and those not subjected to the smoothing processing have certain color differences therebetween respectively. In particular, the offset printing shows significant differences between those subjected to the smoothing processing and those not subjected to the smoothing processing, and also shows a higher average color difference than the maximum color differences of the silver halide photograph and the IJ photograph.

FIGS. 2A to 2D are diagrams illustrating how the smoothing processing reduce the influence by the color difference as described above on the reproduced color or the reproduced gradation characteristic.

FIG. 2A schematically illustrates a document image represented based on the area coverage modulation. FIG. 2B schematically illustrates the document image based on the density modulation. The image based on the area coverage modulation shown in FIG. 2A consists of three colors of colors 21A, 21B, and 21C and is macroscopically recognized as having the same colors of the image based on the density modulation shown in FIG. 2B. For example, a color conversion processing for print output such as an output device color conversion, which will be described later, is applied to each pixel and the color conversion is optimally controlled for each pixel. FIG. 2C and FIG. 2D show the result of subjecting the images shown in FIG. 2A and FIG. 2B to the color conversion processing for print output, respectively. The colors 23A, 23B, and 23C in FIG. 2C show the result of subjecting the pixels of the three colors of 21A, 21B, and 21C to the color conversion processing, respectively. When the three colors of 21A, 21B, and 21C are close to one another, the image shown in FIG. 2C and the image shown in FIG. 2D, which have been subjected to the color conversion for print output, have macroscopically close colors to each other. However, when the three colors of 21A, 21B, and 21C are distant from one another, the image shown in FIG. 2C and the image shown in FIG. 2D, which have been subjected to the color conversion, have macroscopically distant colors from one another.

Consequently, the image shown in FIG. 2A is previously subjected to the smoothing processing to cause the colors 21A, 21B, and 21C to be close to each other so that the image shown in FIG. 2C and the image shown in FIG. 2D, which have been subjected to the color conversion for print output, have macroscopically close colors to each other. In this manner, the smoothing processing can reduce the problem caused by different types of manuscript copies that cause proportionally-different reproduced colors or reproduced gradation characteristics. The smoothing is effective for a document causing a large color difference such as the document printed by the offset printing because the effect of the averaging effect by the smoothing processing is proportionally high.

However, when the smoothing processing described above is simply applied, the gradation characteristic of the printed image may be degraded in the relation with the color conversion for print output that is executed after smoothing processing.

For example, in printing considering a copy function in particular, a gamut mapping, which is a color conversion for print output, may reproduce colors having the lightness equal to or higher than the lightness of the white point of a printer color gamut as white of the printer color gamut and colors having the lightness equal to or lower than the black point of the printer color gamut as black of the printer color gamut. These methods are also called as "whitening" and "blacking", respectively. These methods can realize favorable image reproduction even when copy is repeated for the document which has been obtained by the copy. However, if the smoothing processing is uniformly applied to the gamut of image data, pixels in a certain region may be entirely subjected to the blacking or whitening in the subsequent gamut mapping. In this case, this region is entirely represented by black or white, damaging the gradation characteristic of the entire image.

In compressing the color gamut in the gamut mapping, colors to be compressed is also subjected to the smoothing processing to cause colors having originally-different gradation values to be mapped to the same color. As a result, a gradation characteristic of an image may be damaged.

SUMMARY OF THE INVENTION

An objective of the present invention is to provide an image processing apparatus and an image processing method in which smoothing processing is appropriately applied to a color gamut of an image data to print an image of good color reproduction and good gradation reproduction.

In a first aspect of the present invention, there is provided an image processing apparatus that executes image processing which includes smoothing processing of image data and color conversion processing for color gamut mapping of image data that has been subjected to the smoothing processing, said apparatus comprising: a smoothing control unit that determines a strength of the smoothing processing according to a position of color obtained based on an image data to be subjected to the smoothing processing, in a color gamut to be mapped by the color conversion processing for color gamut mapping.

In a second aspect of the present invention, there is provided an image processing method of executing image processing which includes smoothing processing of image data and color conversion processing for color gamut mapping of image data that has been subjected to the smoothing processing, said method comprising the step of: determining a strength of the smoothing processing according to a position of color obtained based on an image data to be subjected to the smoothing processing, in a color gamut to be mapped by the color conversion processing for color gamut mapping.

According to the configuration as described above, a smoothing strength is set in accordance with the position of the color obtained based on image data to be subjected to the smoothing processing in a color gamut mapped by a color gamut mapping color conversion. For example, when the color obtained based on the image data to be subjected to the smoothing is a color having lightness equal to or lower than blacking lightness, the smoothing processing is prevented from being executed. In this manner, the smoothing processing can be appropriately applied with regard to the color gamut of the image data and an image of good color reproduction and good gradation reproduction can be printed.

Further features of the present invention will become apparent from the following description of exemplary embodiments (with reference to the attached drawings).

BRIEF DESCRIPTION OF THE DRAWINGS

FIG. 3B shows a document stand cover that also functions as an auto document feeder is opened;

DESCRIPTION OF THE EMBODIMENTS

Hereinafter, embodiments of the present invention will be described in detail with reference to the drawings.

MFP

Figure 1:
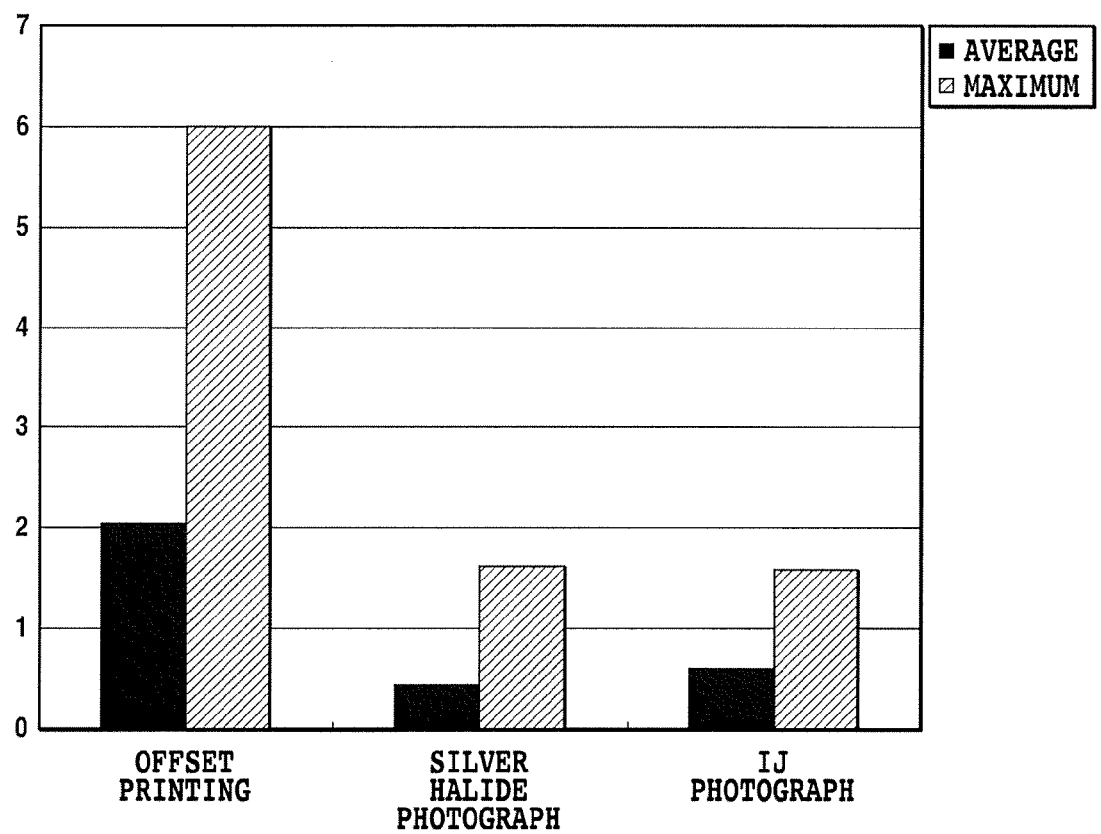
FIG. 1 is a graph showing color differences, as the maximum color difference and an average color difference, between an image printed without subjecting an image to smoothing processing and an image printed with subjecting to the smoothing processing.
Figure 2A:
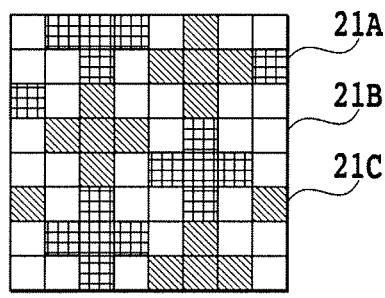
FIGS. 2A to 2D are diagrams illustrating how the smoothing processing reduce the influence by the color difference as described above on the reproduced color or the reproduced gradation characteristic.
Figure 2C:
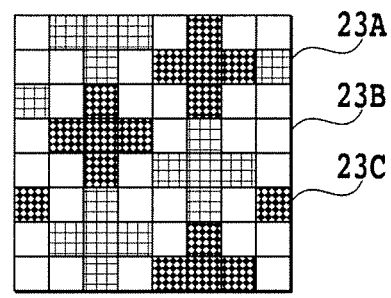
Figure 2B:
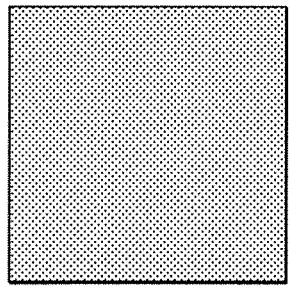
Figure 2D:
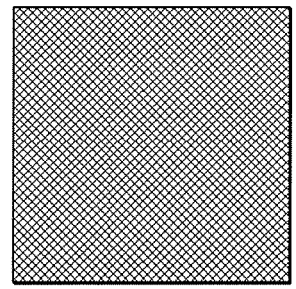
Figure 3A:
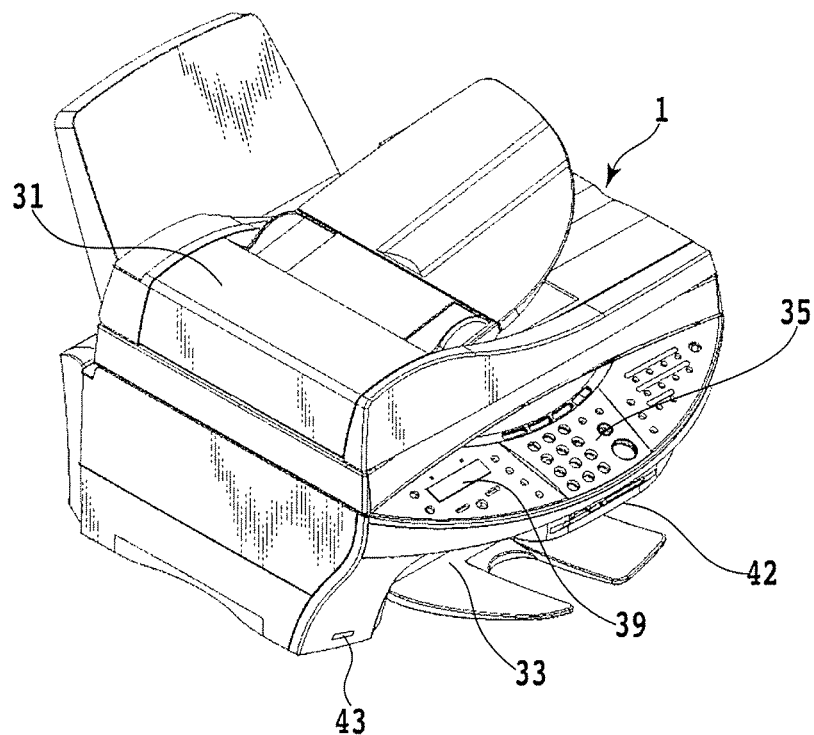
FIGS. 3A and 3B are an appearance perspective view and a perspective view of a multi-function printer (MFP) according to an embodiment of the present invention, respectively.
Figure 3B:
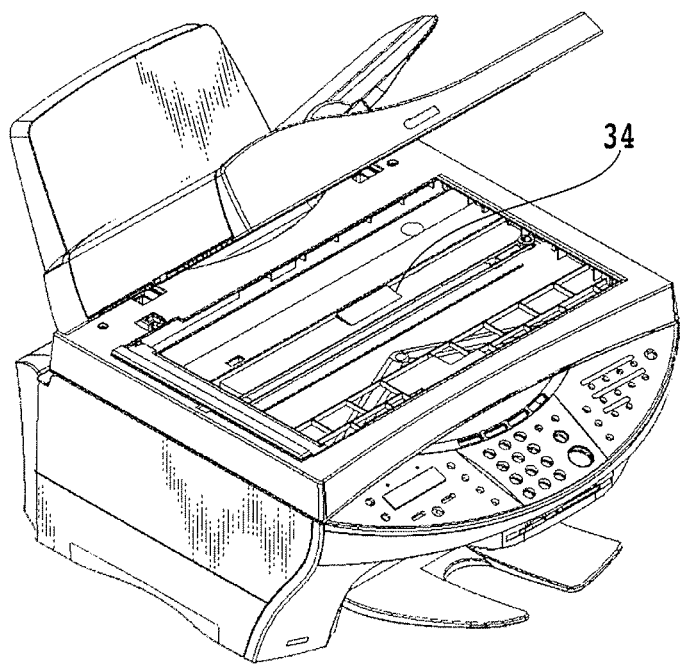

FIGS. 3A and 3B are an appearance perspective view and a perspective view of a multi-function printer (MFP), which shows a cover being opened that is a document cover and also functions as an auto document feeder, according to an embodiment of the present invention, respectively. The MFP apparatus 1 has a function as a general PC printer to receive data from a host computer (PC) to print the data and a scanner function. The MFP apparatus 1 also has a copy function in which the printer prints an image read by the scanner, a function to directly read image data stored in a storage medium such as a memory card to print the data, or a function to receive image data from a digital camera to print the data.

The MFP apparatus 1 includes a reading apparatus 34 by a scanner including a CCD sensor. The reading apparatus reads a document directly placed on a platen or a document supplied from the auto document feeder (hereinafter ADF) 31. A printing apparatus 33 is an ink jet type apparatus that uses four colors of cyan (C), magenta (M), yellow (Y), and black (K) to provide printing on a printing medium such as a paper.

The MFP apparatus 1 further includes an operation panel 35 that includes a display panel 39 and various key switches for example. The back face of the MFP apparatus 1 includes a USB port (not shown) for the communication with the PC. The MFP apparatus 1 further includes a card slot 42 for reading data from various memory cards and a camera port 43 for the data communication with a digital camera. It is noted that the printing method of the printing apparatus in the application of the present invention is not limited to the ink jet method. For example, the printing method also may be other methods such as an electronic photograph method.

Figure 4:
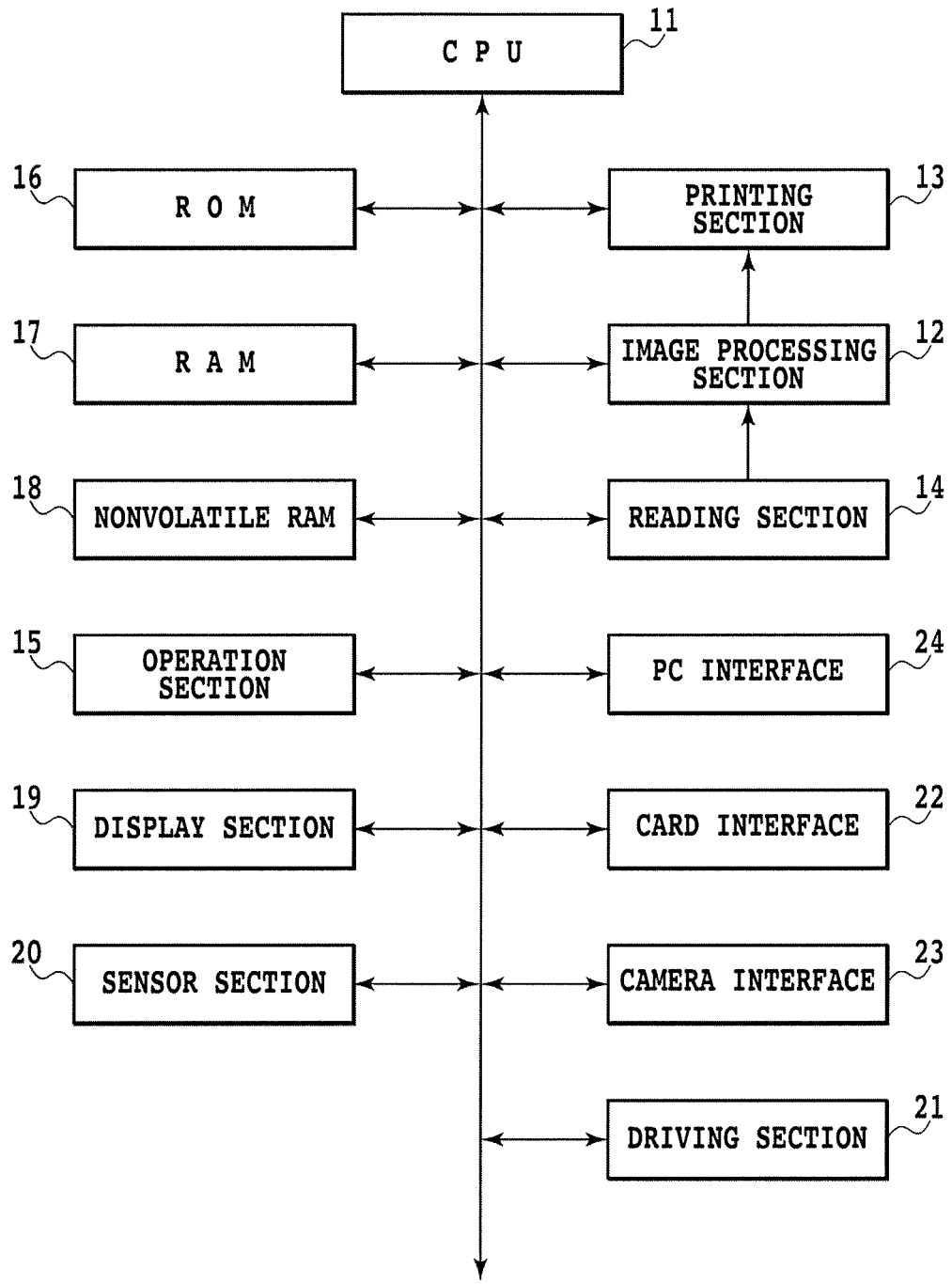
FIG. 4 is a block diagram illustrating a configuration of the control and the image processing for example of the MFP shown in FIGS. 3A and 3B.

FIG. 4 is a block diagram illustrating a configuration for executing a control and image processing of the MFP shown in FIGS. 3A and 3B.

In FIG. 4, a CPU 11 controls various functions of the MFP 1 and carries out, in accordance with a predetermined operation through an operation section 15 having an operation panel 35, an image processing program stored in a ROM 16. This program also includes a processing program of an embodiment of the present invention which will be described later with reference to FIG. 5, FIG. 10, FIG. 11, and FIG. 16 for example. The reading section 14 having the reading apparatus 34 reads a document image to convert the read analog brightness data to digital brightness data of red (R), green (G), and blue (B) to output the data to an image processing section 12. It is noted that the reading section 14 also may include a contact image sensor (CIS) instead of the CCD.

A card interface 22 having the card slot 42 reads, in accordance with the predetermined operation through the operation section 15, image data that is photographed by a digital still camera (hereinafter DSC) and is stored in a memory card for example. The color space of the image data read via the card interface 22 is converted by the image processing section 12, as required, from a DSC color spaces (e.g., YCbCr) to a standard R, G, and B color space (e.g., NTSC-RGB or sRGB). The read image data is also subjected to, based on the header information thereof, various processing required for the application (e.g., resolution conversion for obtaining effective pixels). The camera interface having the camera port 43 is directly connected to the DSC to read image data.

The image processing section 12 executes an image processing which will be described later with reference to FIG. 5, such as an input device color conversion, an image correction/processing, an output device color conversion, a color separation, and a quantization. The resultant printing data obtained by the image processing is stored in the RAM 17. When the printing data stored in the RAM 17 reaches a predetermined amount required for the printing by the printing section 13 having the printing apparatus 33, the printing operation by the printing section 13 is carried out.

A nonvolatile RAM 18 is constituted by a SRAM backed up by a battery for example and stores data unique to the image processing apparatus for example. The operation section includes a photo direct print start key, an order sheet print key, and an order sheet reading key to select the image data stored in the printing medium to start the printing. The nonvolatile RAM 18 further includes a copy start key for monochrome copy or color copy, a mode key for specifying a mode for a copy resolution or an image quality, a stop key for stopping a copy operation for example, and a ten key and a registration key for inputting the number of copies. The CPU 11 detects the depression state of these keys to control the respective section depending on the state.

The display section 19 includes a display panel 39 (FIG. 3A). Specifically, this display section includes a dot matrix type liquid crystal display section (LCD) and a LCD driver to provide various displays based on the control by the CPU 11. The display section 19 also displays thumbnails of image data stored in a storage medium. The printing section 13 having the printing apparatus 33 is constituted by an ink jet type printing head, a general-purpose IC for example and the like and reads, based on the control by the CPU 11, the printing data stored in the RAM 17 to print a hard copy.

A driving section 21 is composed, for example, of a stepping motor and a DC motor for driving a paper feed roller in the above-described reading section 4 and printing section 3; a gear for transmitting the driving force of the stepping motor and the DC motor; and a driver circuit for controlling the stepping motor and the DC motor. The sensor section 20 is composed, for example, of a printing paper width sensor, a printing paper existence sensor, a document width sensor, a document existence sensor, and a printing medium sensor. The CPU 11 detects the states of the document or the printing paper based on the information obtained from these sensors.

The PC interface 24 is an interface between the PC and this MFP apparatus 1. The MFP apparatus receives an instruction for a printing operation and a reading operation through this PC interface 24.

In the configuration as described above, during a copy operation, the image data read by the reading apparatus 34 is subjected to a predetermined image processing by the image processing section 12 and printing is performed by the printing apparatus 33 based on the resulting data of the image processing.

Image Processing

Figure 5:
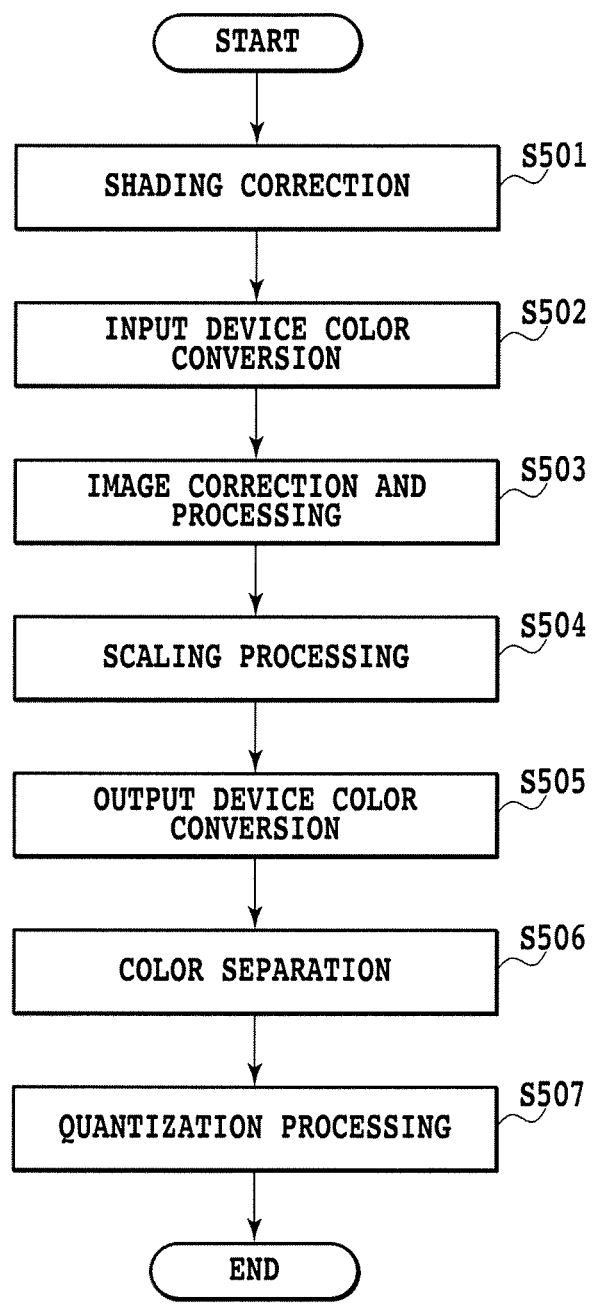
FIG. 5 is a flowchart showing the image processing carried out in the copying operation in the MFP.

FIG. 5 is a flowchart showing an image processing executed in a copy operation in the MFP of this embodiment.

In FIG. 5, at the beginning, Step 501 subjects the data read and AD-converted by the reading section 14 to a shading correction for correcting variations in the data caused due to variations of imaging devices. Next, Step 502 executes an input device color conversion. This conversion can convert the image signal data unique to the color space of the device to signal data of a standard color space not depending on the device. The standard color space may be based on the known ones such as sRGB specified by International Electrotechnical Commission (IEC) and AdobeRGB proposed by Adobe Systems. In this embodiment, the conversion is performed by using a lookup table. It is noted that a matrix calculation method also may be used as a conversion method.

The converted data is subjected in Step 503 to a correction processing/processing. The details of these processing include an edge reinforcement processing for correcting the so-called blur of an image due to the reading operation, a character processing for improving the readability of characters, a processing for removing the offset caused in the reading operation by light emission, and the like. In addition to these processing, a smoothing processing to which the present invention is applied are also performed, which will be described in detail with reference to FIG. 9. Specifically, a smoothing process control is performed to cause the smoothing processing in the gamut mapping in Step 505 to be executed in different ways according to positions or areas in a color gamut in which image signal data exists. It should be noted that the smoothing processing may be performed after the Step 504. In the case that a scale reduction is subjected to an image in Step 504, the number of pixels processed in the smoothing processing is made smaller by the smoothing process control performed after Step 504 than that by the control of the smoothing processing performed before Step 504

Step 504 executes an image scaling processing. In this step, the magnification is converted to an intended magnification when a different magnification is specified by a user or when allocation copy is specified to allocate two manuscript copies to a single paper. The conversion method may generally be a bi-cubic method or a nearest neighbor method.

Next, Step 505 converts image signal data of the standard color space to signal data unique to the printing apparatus as an output device. This conversion is, as described later, a conversion (color conversion of color gamut mapping) by using a gamut mapping.

Next, Step 506 executes a conversion processing for converting the signal data unique to the output device to ink color data of cyan (C), magenta (M), yellow (Y), and black (K) used in the MFP. This conversion also may use the same method as that of Step 502. Then, Step 507 converts the image signal data to have levels at which the data can be printed by the printing apparatus 33. Specifically, the printing apparatus 33 of this embodiment represents an image in a binary manner based on whether ink is ejected or not. Thus, a quantization method such as error diffusion is used to convert the data to binary data.

Next, the color conversion for the output device of Step 505 will be described further in detail. In this embodiment, a lookup table for the color conversion for the output device is defined as an output profile and will be hereinafter also referred to as an output color conversion table.

The output color conversion table shows a correspondence between color signals of the sRGB color space as a standard color space and color signals of a color gamut of the printing apparatus (hereinafter also simply referred to as a printer color gamut). Specifically, the table defines discrete lattice points by using the signal data of the sRGB color space and makes correspondences between the respective lattice points and color signals of the printer color gamut.

Figure 6:
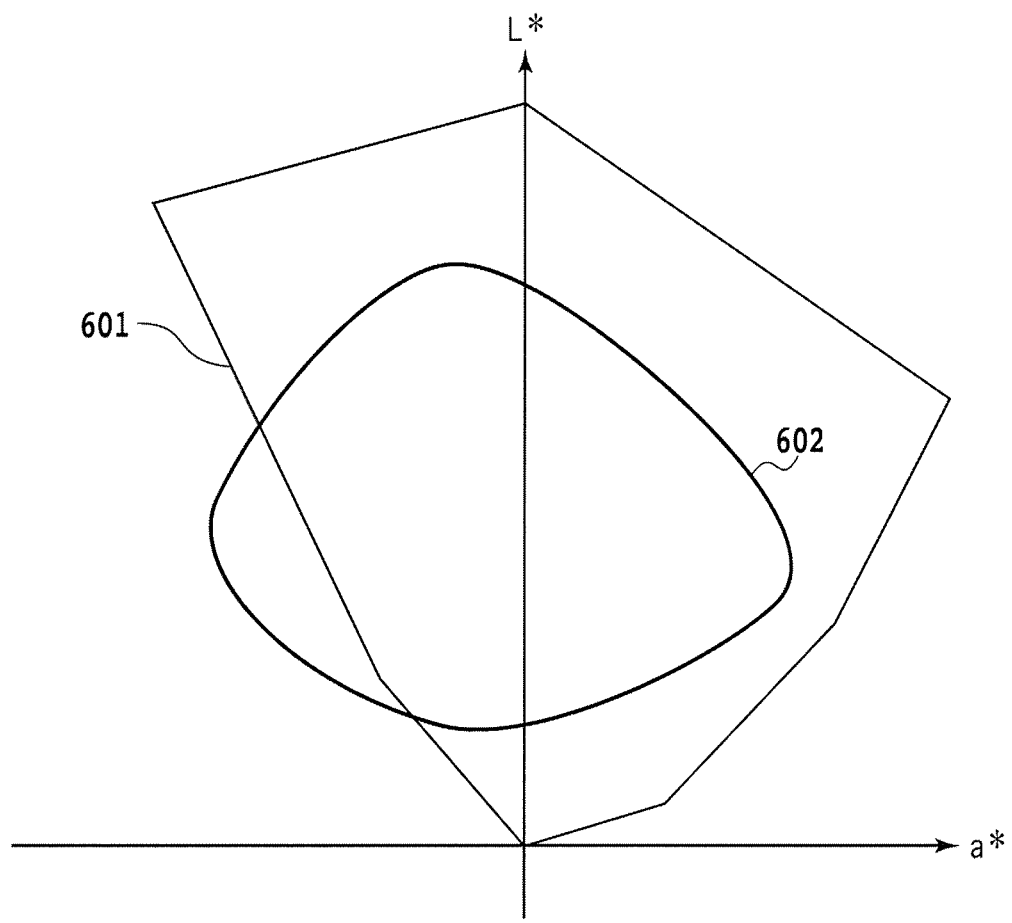
FIG. 6 is a diagram showing a color gamut of a standard color space and a printer color gamut by CIE-L*a*b color coordinate system.

FIG. 6 shows a sRGB color gamut 601 by signals of a sRGB color space as a standard color space and a printer color gamut 602, in a CIE-L*a*b* color coordinate system. Hereinafter, it is assumed that all color spaces shown in the drawings of embodiments of the present invention are represented based on the CIE-L*a*b* color coordinate system. It is noted that this color coordinate system to be handled is not limited to the CIE-L*a*b* color coordinate system and also may be a similar color space such as a L*u*v* color space.

As shown in FIG. 6, the sRGB color gamut 601 and the printer color gamut 602 have different shapes and sizes for example. For this reason, the color conversion table is prepared by using the "gamut compression" technique for compressing the color gamut of the standard color space to the printer color gamut. In the gamut compression used in this embodiment, uncompressed region, in which colors of the standard color space are reproduced as colors colorimetrically identical with colors in the printer color gamut, is defined in the printer color gamut, and colors of the standard color space except for the colors reproduced in the uncompressed region are compressed to colors in a printer color gamut out of the uncompressed region. By using the gamut compression method as described above, colors within the uncompressed region can be reproduced to calorimetrically correspond to the color of the color gamut of the standard color space and colors not within the uncompressed region can be reproduced to retain the gradation. For example, this gamut compression method allows, even when different printing media used for copy are a photograph-exclusive paper and a mat paper and have difference color gamut shapes, the same colors to be reproduced on these media.

Figure 7:
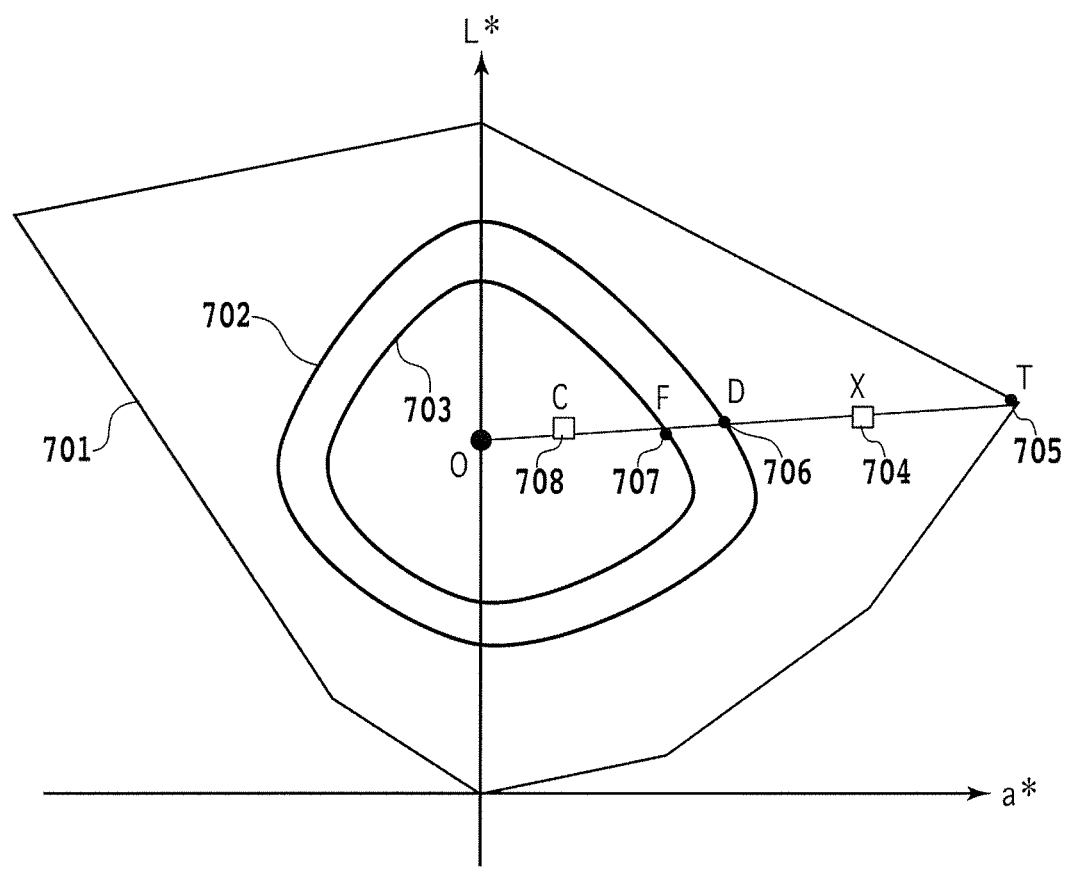
FIG. 7 is a diagram showing an example of the gamut compression used in one embodiment of the present invention.

FIG. 7 is a diagram illustrating an example of the gamut compression used in this embodiment. In FIG. 7, the color gamut 701 and the color gamut 702 are obtained by projecting the color gamut of the sRGB color space and the printer color gamut on the L*a plane. The color gamut 703 shows the uncompressed region for reproducing the color that is calorimetrically identical with that of the sRGB color space. In this example, the uncompressed region has a similar shape as that of the printer color gamut and is 80% of the size of the printer color gamut. The point "O" shows a compression convergence point. The points 704 and 708 show colors corresponding to lattice points in the sRGB color space.

The gamut compression firstly determines whether the lattice point of the sRGB color space is positioned within the uncompressed region or not. This processing for determining whether the point exists within the color gamut or not is performed based on the method as described below. First, a length of a vector (called as a source vector) connecting the point to be determined to the compression convergence point is calculated. Next, a length of a vector having a sense from the compression convergence point to the point to be determined, which vector (called as a color gamut vector) connects the compression convergence point to an intersection point at which the vector intersects with the surface of the color gamut is calculated and the length of the source vector is compared with the length of the color gamut vector. When the length of the source vector is longer than the length of the color gamut vector, the point to be determined is determined as being out of the color gamut. When the length of the source vector is shorter than the length of the color gamut vector, the point to be determined is determined as being within the color gamut.

The above described processing for determining whether the point exists within the color gamut or not determines that the point 708 is within the uncompressed region. In this case, the compression processing is not performed and the same value as that of the input sRGB value is retained. On the other hand, the point 704 is determined as the one for a color not within the uncompressed region and thus is subjected to the gamut compression based on the following method. That is, the point 704 is subjected to the gamut compression to be move to a point in the printer color gamut which is not within the uncompressed region. More specifically, the distance X between the point 704 and the compression convergence point O is calculated. Further, points 705, 706 and 707 at the intersections of a straight line passing through the point O and the point 704 with respective the outline of the color gamut 701 in the sRGB color space, the outermost line of the printer color gamut 702, and the outline of the uncompressed region 703 are found respectively, and the respective distances between the respective intersection points and the point O are calculated. In FIG. 7, the respective distances are represented by T, D, and F. Based on the relation between the distances from the compression convergence point O, the point 704 is compressed to be in the printer color gamut. The point 704 is linearly compressed to a point on the straight line passing through the point O and the point 704 so to correspond to the point at a distance that can be calculated by the following compression function (1).

$$X' = \frac{(D-F)(X-F)}{T-F} + F \qquad (1)$$

It is noted that the compression function does not have to be linear as shown in the formula (1) and also may be a multi-dimensional function or a similar function according to which a position farther away from the color gamut is subjected to losing of gradation. Further, although the size of the uncompressed region is about 80% of the size of the printer color gamut, the size of the uncompressed region is not limited to this. When the size of the uncompressed region is 100% the same as the printer color gamut, the color in the printer color gamut can be subjected to the gamut compression method according to which the color can be colorimetrically identical and colors not within the color gamut are lost.

Next, the so-called whitening and blacking processing will be described that are carried out as a part of the above-described gamut compression in the gamut mapping of this embodiment.

There may be a case where a copy function is used to copy a document and the copied printing matter as a document is again copied. In order to allow such a repeated copying to realize a favorable image reproduction, a color having a lightness equal to or higher than a specific lightness (e.g., the lightness of a white point of the printer color gamut) is mapped on the white point in the printer color gamut (white of a printing paper) (this mapping is referred to as "whitening"). Similarly, a color having a lightness equal to or lower than a specific lightness (e.g., the lightness of a black point of the printer color gamut) is mapped on the black point in the printer color gamut (this mapping is referred to as "blacking").

Figure 8:
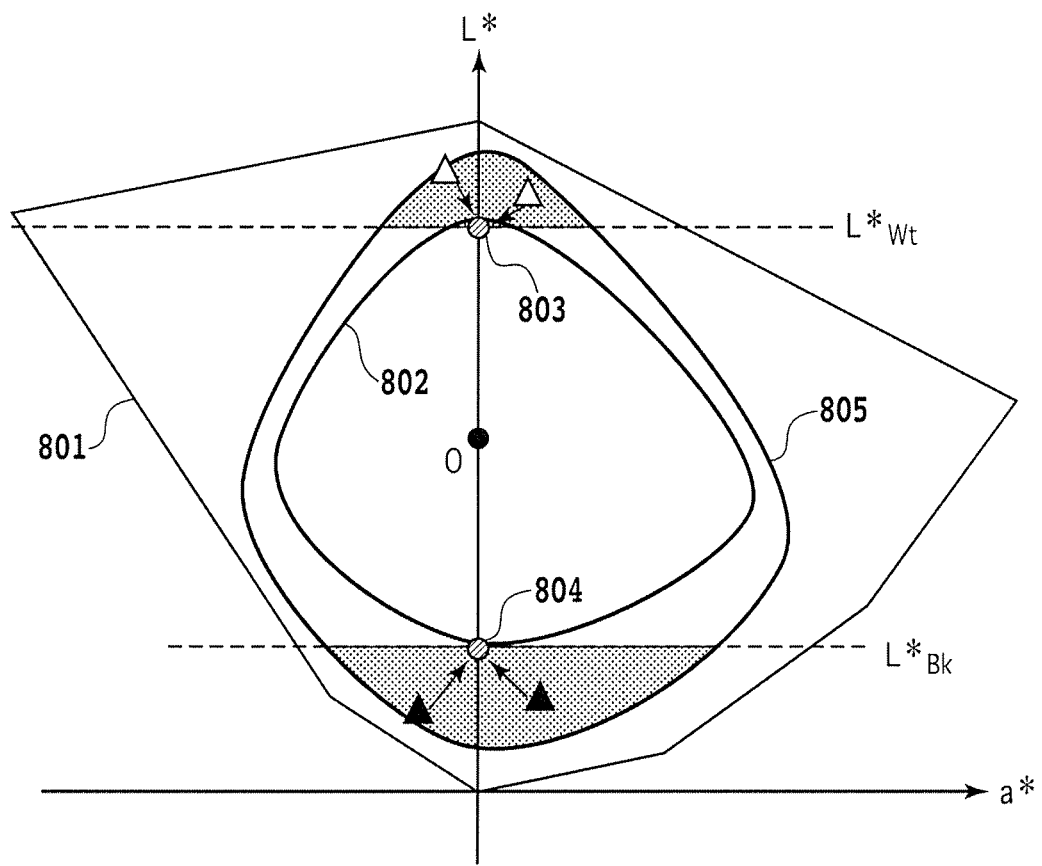
FIG. 8 is a diagram illustrating the details of whitening and blacking.

FIG. 8 is a diagram illustrating the details of the whitening and blacking. As described with reference to FIG. 7, a color gamut 801 and a color gamut 802 are obtained by projecting the color gamut of the sRGB color space and the printer color gamut on the L*a* plane, respectively.

The color gamut 802 is a printer color gamut when printing is performed onto a printing medium used for a copy operation. A point 803 shows a white point of the printer color gamut 802. L*Wt shows the lightness of the white point of the printer color gamut. Among points in the color gamut 801 of the sRGB color space, the lattice points (colors) having the lightness equal to or higher than L*Wt is all subjected to the gamut compression to be shifted to the point 803. In this manner, the whitening is performed. On the other hand, the point 804 shows a black point of the printer color gamut and L*Bk shows the lightness of the black point of the printer color gamut. In the blacking processing, among points in the color gamut 801 of the sRGB color space, the lattice point (color) having the lightness equal to or lower than L*Bk is all subjected to the gamut compression to be shifted to the point 804.

As shown in FIG. 8, when an input document has the color gamut 805 for example, the colors shown by outlined triangles in the color gamut 805 have the lightness higher than the L*Wt and thus is entirely reproduced by white of a printing medium used. The colors shown by black triangles have the lightness lower than the L*Bk and thus is reproduced by black of the printer color gamut. Hereinafter, L*Bk will be referred to as a "blacking lightness" while L*Wt will be referred to as a "whitening lightness". Although L*Bk is the lightness of the black point of the printer color gamut in this example, the present invention is not limited to this aspect. For example, an error caused when reading a document may cause the black point to be wrongly recognized as having a lighter color. These may be also taken into consideration and L*Bk may be set as a lightness that is higher than that of the black point of the printer color gamut.

Next, the color separation table used in the color separation processing of Step 506 will be described. When the image signals obtained by the output device color conversion (gamut mapping) of the above-described Step 505 is RGB signals, the RGB signals within the color gamut and colors specified in the calorimetric space (e.g., a CIE-L*a*b* value) have one-to-one correspondences. Thus, the color space by the RGB signal is used to specify for example 729 equally-spaced lattice points. Then, color patch data corresponding to these 729 lattice points is prepared and patches based on the color patch data are printed by a printing apparatus. The printed color patches are subjected to colorimetry to specify the color of the lattice point represented by an RGB value unique to the printer as a color based on the CIE-L*a*b* color coordinate system for example. Next, the lattice points of the sRGB color space obtained by the compression processing of Step 505 are converted to colors in the CIE-L*a*b color coordinate system, and respective lattice points having the minimum color differences from the converted colors are found from the above 729 colorimetry values. Then, lattice points around the point having the minimum color difference are used for an interpolating calculation to obtain printer RGB values corresponding to lattice points of the sRGB color space, respectively. In the above described manner, the color separation table can be prepared that describes which ink colors of the printing apparatus are used for outputting the colors of the input color space.

Smoothing Processing

Figure 9A:
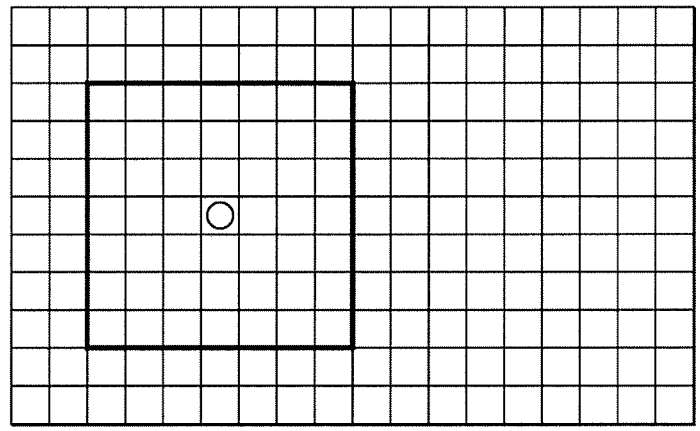
FIGS. 9A to 9C are diagrams illustrating a processing unit of the smoothing processing according to one embodiment of the present invention.
Figure 9B:
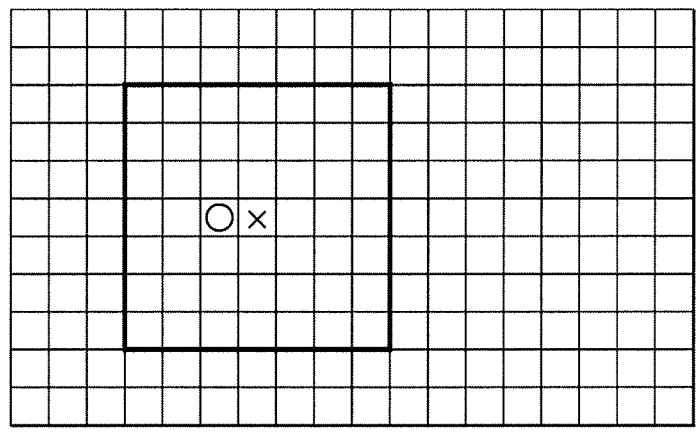
Figure 9C:
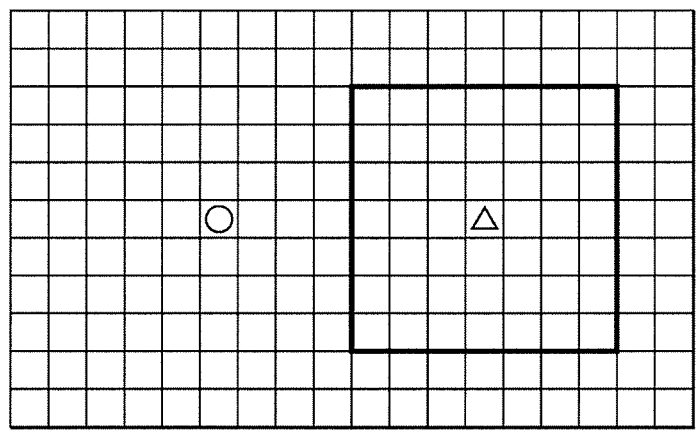

FIGS. 9A to 9C are diagrams illustrating a smoothing processing executed in Step 503 among the image processing shown in FIG. 5 and specifically show a processing unit of the smoothing processing.

FIG. 9A shows a case where the processing unit corresponds to a pixel unit. In the smoothing processing, a pixel denoted by a "o" mark in FIG. 9A is set as an object pixel. Next, a region that includes the object pixel at the center, that is surrounded by the thick line, and that consists of 7×7 pixels (7×7 region) is set. Then, the image signal within the set 7×7 region is used to set a smoothing strength to the object pixel for correcting the object pixel. For example, the correction is performed by replacing the pixel value of the object pixel by an average value of image signal values of all pixels in the 7×7 region. In this case, the smoothing strength is "1" showing that whole pixel value is replaced. It is noted that specific embodiments of the smoothing processing or the smoothing strength will be described in the respective embodiments which will be described later.

After the processing as described above, a pixel neighboring to the object pixel such as a pixel denoted by an "x" mark in FIG. 9B for example is set as the next object pixel. Then, in the same manner as that described above, the pixel denoted by the "x" mark is assumed as the object pixel to set the 7×7 region and to execute the smoothing processing. Thereafter, the object pixel is similarly moved by one pixel to set the 7×7 region each time for subjecting all object pixels for the smoothing processing to the smoothing processing.

When the processing unit corresponds to a region unit, the 7×7 region is set with regards to the pixel denoted by the "o" mark in FIG. 9A and the smoothing strength set to the pixel denoted by the "o" mark is applied to a plurality of pixels e.g., all pixels in the 7×7 region. Then, the 7×7 region is set with regards to the pixel denoted by a "Δ" mark shown in FIG. 9C to move processing unit so that the 7×7 region for the pixel denoted by the "o" mark and the 7×7 region for the pixel denoted by the "Δ" mark are adjacent to each other. It is noted that the processing unit used as the pixel unit can set the smoothing strength with a higher accuracy.

Figure 10:
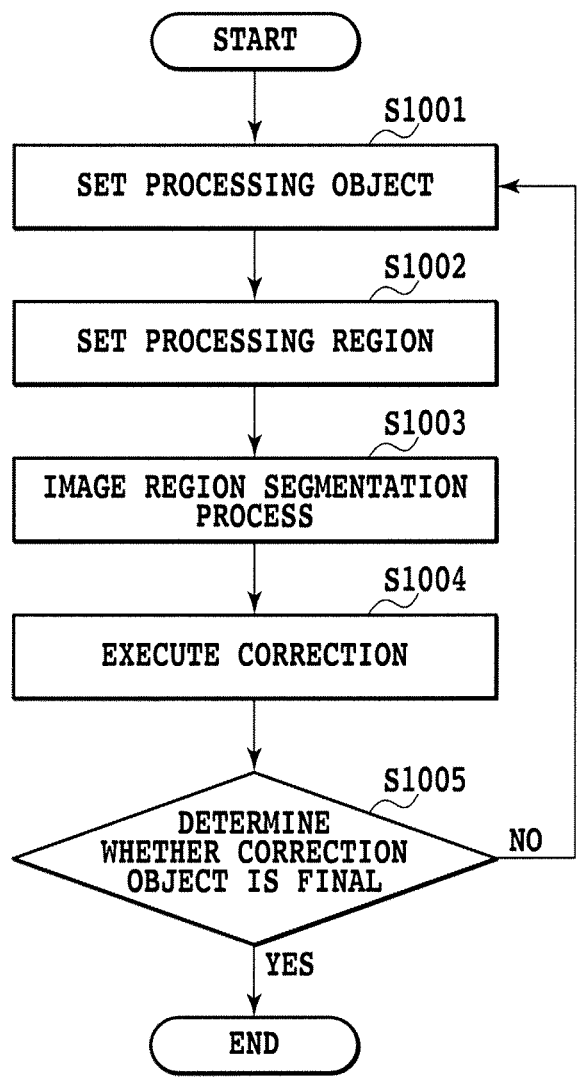
FIG. 10 is a flowchart illustrating the smoothing processing of this embodiment.

FIG. 10 is a flowchart illustrating the smoothing processing of this embodiment. Step 1001 sets a target to be subjected to the processing. The first processing object is set immediately after the start of this processing. When Step 1001 is returned from Step 1005, the next processing object is set. Step 1002 sets a processing region. The processing region is a region composed of a plurality of pixels including the processing unit as described above (the 7×7 region in the above example).

Step 1003 performs image region segmentation. A region with respect to the processing unit is determined to specify region information. Specifically, in the determination, it is determined whether the image region is an edge region such as a character or a flat region such as an image. Next, Step 1004 performs a correction by the smoothing based on the above determination of the image region. Specifically, when the region information determined in Step 1003 is the flat region, the smoothing (correction) is performed as an object of the smoothing processing and, when the region information determined in Step 1003 is the edge region, the smoothing processing is not performed and Step 1003 is completed. It is noted that even if an image is of the region to be subjected to the smoothing processing, there may be a pixel of the image that is not subjected to the smoothing processing in the smoothing processing according to the embodiment of the present invention, as described later with reference to FIG. 11.

Then, Step 1005 determines whether the corrections are completed for all of the processing objects or not. When the corrections for all processing objects are not completed, the processing is repeated from Step 1001.

Some embodiments showing how to apply the smoothing processing in an image-processing configuration described above will be described below. More specifically, the respective embodiments cause the smoothing processing executed in the correction/process processing of Step 503 shown in FIG. 5 to be different depending on what region of a color gamut in which a color is located in the color gamut mapping in Step 505.

It is noted that the following respective embodiments assume a region considered in the smoothing as a region composed of 7 pixels×7 pixels and use a pixel unit as a processing unit. Although the following respective embodiments will describe an image signal range of 0 to 255 as an example, the image signal range is not limited to this and also can be set in accordance with the MFP apparatus or the image processing.

In the following embodiments, a character region and regions other than the character region are previously separated from one another in the smoothing processing as described with reference to FIG. 10. Thus, image input in the processing of the respective embodiments described below is carried out based on image data other than the one for the character region. The character region is subjected to a processing such as an edge reinforcement after the processing described in the embodiments are completed. Finally, the image subjected to the processing in the respective embodiments is synthesized with the image subjected to the edge reinforcement processing and the like to send the resultant data to the processing of Step 504 shown in FIG. 5. It is noted that, although this embodiment has subjected a character region and a region other than the character region to individual processing to finally synthesize the regions as described above, the invention is not limited to this. For example, the respective pixels may be attached with flags so that a character region and a region other than the character region can be differentiated to subject a pixel of the character region to the edge reinforcement processing and to subject the region other than the character region to the smoothing processing described in the following embodiments. What is important in carrying out the present invention is that a character region and a region other than the character region are subjected to different correction processing. The method for realizing this is not limited to the above two examples.

Embodiment 1

The first embodiment of the present invention relates to a configuration for solving a disadvantage caused by the blacking and whitening processing. The blacking lightness described below is assumed as lightness of black in a printer color gamut when printing is performed on a predetermined printing medium used in a printing apparatus. The whitening lightness described below is assumed as lightness of white in the printer color gamut of the printing apparatus. Hereinafter, the blacking lightness is represented as L*Bk and the whitening lightness is represented as L*Wt.

Figure 11:
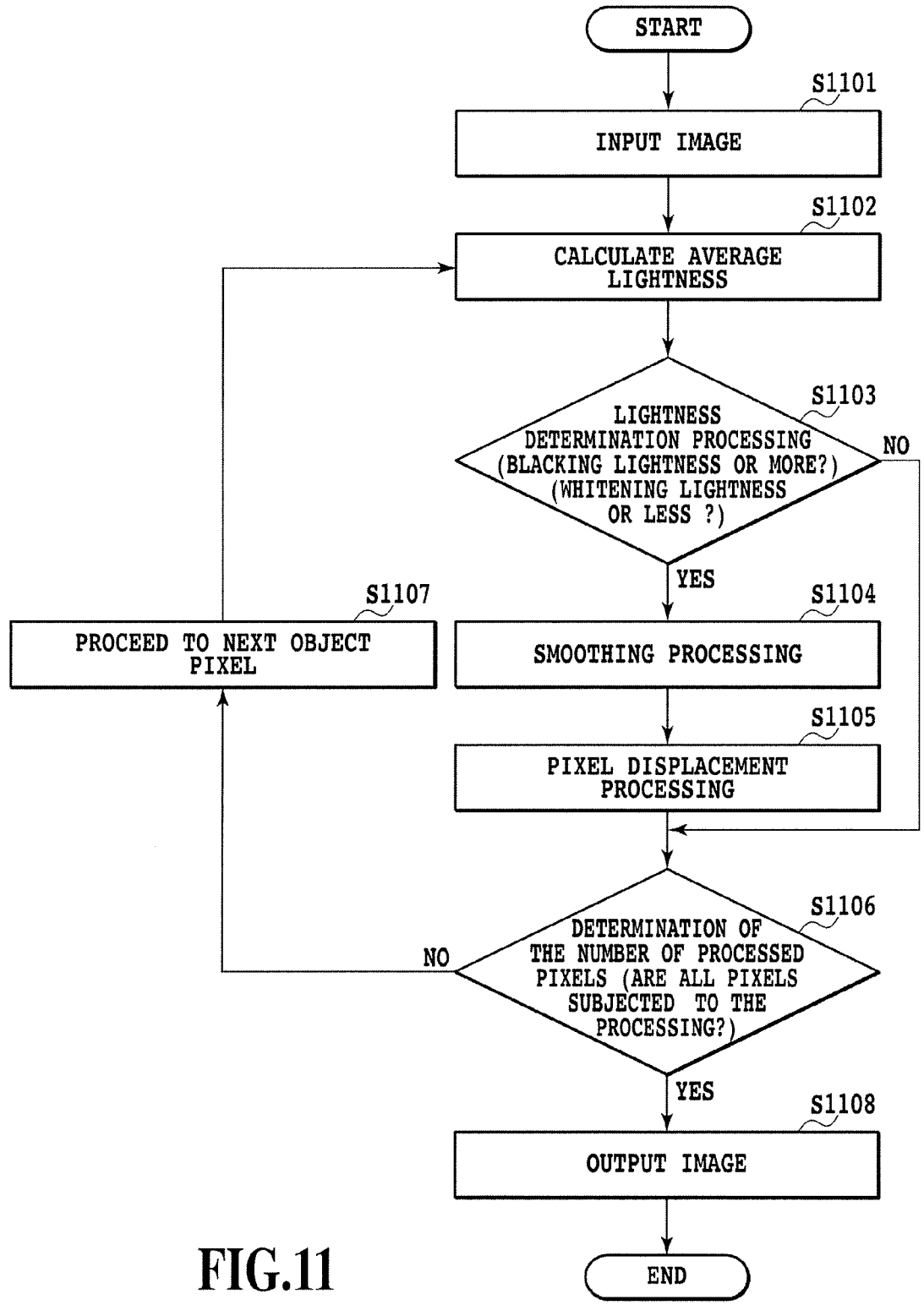
FIG. 11 is a flowchart illustrating the details of the smoothing processing according to a first embodiment of the present invention.

FIG. 11 is a flowchart showing the details of smoothing processing according to this embodiment performed in Step 503 of FIG. 5.

First, Step 1101 inputs the image data given to Step 503 (FIG. 5). Step 1102 obtains the respective lightness of 7 pixels×7 pixels around an object pixel in the input image to calculate the average LAVE* (average lightness value).

The average lightness LAVE* is an amount of characteristic which is an object of determination in the lightness determination processing of Step 1103. When the input image is image signal data of an sRGB color space, the average LAVE* can be obtained as follows. Specifically, the signal values of respective pixels in the 7 pixels×7 pixels region around the object pixel are converted to colors based on the CIE-L*a*b* color coordinate system. The lightness is represented by L* values of the CIE-L*a*b* color coordinate system. It is noted that the color coordinate system used is not limited to the CIE-L*a*b* color coordinate system and also can be a similar color coordinate system such as the L*u*v* color coordinate system. The average lightness LAVE* can be calculated by adding the respective L* values of 7 pixels×7 pixels and dividing a total value by the total number of pixels of 49.

It is noted that, although the above example has described the calculation of the average lightness, an amount of characteristic weighted depending on the positional relation with the object pixel as described below also may be used.

Figure 12:
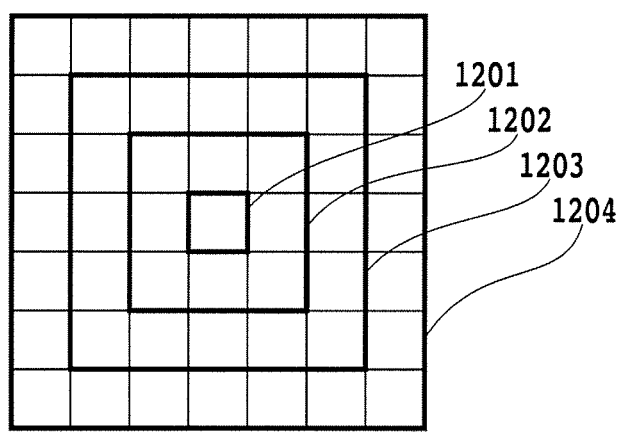
FIG. 12 is a diagram illustrating weighting regarding the calculation of an average lightness according to the first embodiment.

FIG. 12 is a diagram illustrating dividing a determination object region of 7 pixels×7 pixels into respective regions surrounded by thick lines and weighting the respective regions. The reference numeral 1201 denotes an object pixel. The reference numeral 1202 denotes a region of 8 pixels around the object pixel 1201. Regions 1203 and 1204 similarly show regions formed at the outer periphery, respectively. The Region is divided in the manner as described above to subject the object pixel 1201 to the weighting of 1.0 time, the pixel of the region 1202 to the weighting of 0.8 time, the pixel of the region 1203 to 0.5 time, and the pixel of the region 1204 to the weighting of 0.2 time to calculate an average value of these weighted lightness. Alternatively, the amount of characteristic may be a median value in a lightness value distribution of the region of 7 pixels×7 pixels for example.

After the calculation of the average lightness of peripheral pixels (the object pixel and surrounding pixels) as described above, Step 1103 determines whether the calculated average lightness LAVE* is lower than the whitening lightness L*Wt (FIG. 8) and is higher than the blacking lightness L*Bk (FIG. 8) or not. When it is determined that the average lightness LAVE* is equal to or lower than the blacking lightness L*Bk and is equal to or higher than the whitening lightness L*Wt, a smoothing processing of Step 1104 and a displacement processing of Step 1105 based on the smoothing processing are not performed. That is, the smoothing strength in this case is set to be 0.

As described above, when the amount of characteristic related to the lightness is equal to or lower than the blacking lightness L*Bk (equal to or lower than a second lightness) or is equal to or higher than the whitening lightness L*Wt (equal to or higher than a first lightness), the smoothing processing is prevented from being performed, thereby preventing a deteriorated gradation characteristic such as losing gradation caused by the execution of the smoothing processing.

Figure 13:
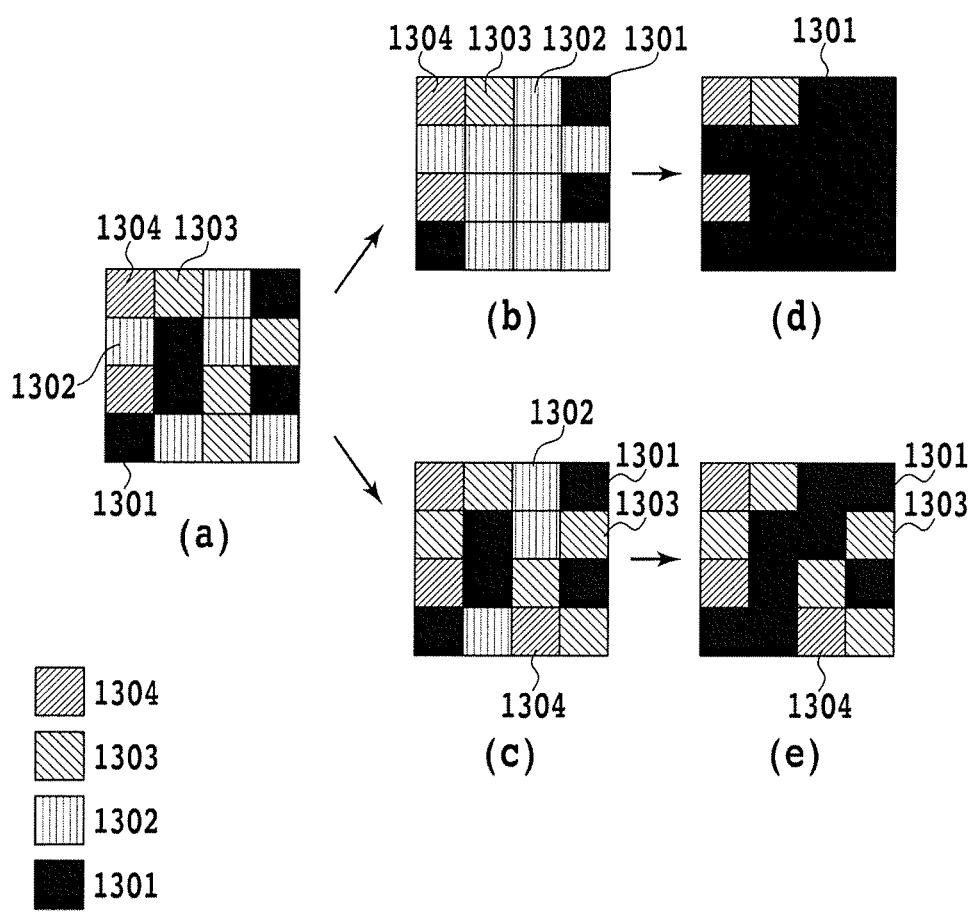
FIG. 13 is a diagram illustrating an effect of the first embodiment.

FIG. 13 is a diagram illustrating this effect. It is noted that, although FIG. 13 shows the effect for the blacking processing, the same also applies to the whitening processing as is clear from the following description.

In FIG. 13, a section (a) shows an image of 4 pixels×4 pixels that is a part of an image prior to the smoothing processing of Step 503. Among these pixels, the pixel 1301 is a black pixel. The pixel 1301 has a signal value of (R, G, B)=(0, 0, 0). The pixel 1302 has the lightness equal to or lower than the blacking lightness L*Bk. On the other hand, the pixels 1303 and 1304 are pixels having the lightness higher than the blacking lightness L*Bk, respectively.

In FIG. 13, a section (b) shows the image data when the smoothing is carried out in which, regardless of the blacking lightness or the whitening lightness, the object pixel is replaced with a value obtained by averaging the RGB values of peripheral 7 pixels×7 pixels. On the other hand, a section (c) in FIG. 13 shows the image data when the smoothing processing according to this embodiment, in which the smoothing processing considering the blacking lightness and the whitening lightness, is carried out. More specifically, the section (c) shows the image data as a result of executing the smoothing processing only when the average lightness LAVE* of the peripheral pixels is higher than the blacking lightness L*Bk and is lower than the whitening lightness L*Wt. As shown in the section (c) of FIG. 13, according to this embodiment, when the average lightness of the 7 pixels×7 pixels is equal to or lower than the blacking lightness L*Bk, the smoothing processing is prevented from being performed and thus a pixel which has not been subjected to the smoothing can be maintained in the image data. On the other hand, when the smoothing processing is performed without considering the blacking lightness or the whitening lightness, all pixels are subjected to the smoothing as shown in the section (b) of FIG. 13 to cause the respective pixels to have averaged signal values entirely.

In FIG. 13, the section (d) shows image data after the image shown in the section (b) of FIG. 13 is subjected to the output device color conversion processing (gamut mapping) of Step 505 shown in FIG. 5. Here, an uncompressed region in the gamut compression is set to be 100% of the printer color gamut that is a color gamut after the mapping. Specifically, colors other than those in the printer color gamut are all compressed to those at the outermost surface of the printer color gamut to be reproduced, and colors in the printer color gamut are subjected to calorimetrically identical color reproduction.

In the section (b) of FIG. 13, the pixels 1303 and 1304 show colors within the printer color gamut, which are not changed by the output device color conversion processing. On the other hand, the pixels 1301 and 1302 show colors out of the printer color gamut, which have the lightness equal to or lower than the blacking lightness L*Bk. In this case, the pixels 1301 and 1302 are all converted to a black point as shown in the section (d) of FIG. 13. Thus, when the resultant image is macroscopically observed, this part of the image has a deteriorated gradation such as blacking of this part in the image.

On the other hand, the section (e) of FIG. 13 shows image data after the image shown in the section (c) of FIG. 13 is similarly subjected to the output device color conversion processing of Step 595. As shown in the section (c) of FIG. 13, the object pixel having the average lightness equal to or lower than the blacking lightness L*Bk is prevented from being subjected to the smoothing processing. Thus, when the object pixel originally has a signal value higher than the blacking lightness, the signal value of the object pixel is conserved. As a result, the pixel having the signal value for which the lightness is originally higher than the blacking lightness is prevented from being converted by the gamut compression to the black point. As described above, according to this embodiment, the pixel originally having the lightness equal to or lower than the blacking lightness is blacked, a pixel having the lightness higher than the blacking lightness is not compressed to the black point, thus preventing, when being macroscopically observed, the resultant image from having a deteriorated gradation characteristic.

With reference to FIG. 11 again, when Step 1103 determines that the average lightness LAVE* is higher than the blacking lightness L*Bk or is lower than the whitening lightness L*Wt, the processing proceeds to Step 1104 to subject the object pixel to the smoothing processing. More specifically, the smoothing strength is set to be 1 in this case. In this embodiment, the smoothing processing calculates an average value (average image signal value) of the RGS signals of the object pixel and the peripheral 7 pixel×7 pixels and the calculated average value is set as the value (RSMG, GSMG, and BSMG) of the object pixel after the smoothing. It is noted that the smoothing method is not limited to this example. For example, the peripheral pixels of 7 pixels×7 pixels also may be converted to CIE-L*a*b* value to calculate an average value and subsequently the average value is converted to sRGB value as a value after the smoothing. Also, for example, in order to weight a object pixel, a pixel closest to the object pixel based on the distance from the object pixel to peripheral pixels may be weighted 0.8 times, the next closest pixel may be weighted 0.5 times, and the farthest pixel may be weighted 0.2 times to calculate an average value of the weighted values as a value after the smoothing. In addition, in accordance with the calculated average lightness LAVE* of the object pixel, the smoothing processing also may be carried out so that the smoothing strength is increased as the lightness is closer to the blacking lightness L*Bk or whitening lightness L*Wt for example.

After the calculation of the value after the smoothing, Step 1105 causes the signal value (R, G, and B) of the object pixel to be displaced with the value (RSMG, GSMG, and BSMG) after the smoothing calculated as described above.

Step 1106 determines whether all pixels are subjected to the processing from Step 1102 to Step 1105 or not. When all pixel are not subjected to the processing from Step 1102 to Step 1105, Step 1107 proceeds to the next object pixel to repeat the above-described processing until the processing of all pixels are completed. When the processing of all pixels are completed, Step 1108 outputs image data that has been subjected to the correction/process processing to the subsequent scaling processing (Step 504 of FIG. 5).

As described above, according to the embodiment, the smoothing considering the blacking lightness and the whitening lightness is performed. Thus, a deteriorated gradation characteristic, which is induced by the smoothing, can be prevented from occurring due to the blacking and the whitening in the gamut compression of the subsequent output profile. On the other hand, a pixel that has been subjected to the smoothing processing can be reproduced as image data of the same color without depending on the document type.

It is noted that, although this embodiment has described an embodiment where the blacking processing and the whitening processing are performed in the same gamut mapping, only one of the blacking processing and the whitening processing also can be performed. For example, an image subjected to the blacking processing and the smoothing processing also may be subsequently subjected to the whitening processing and the further smoothing processing.

Embodiment 2

In the above-described first embodiment, an average lightness of peripheral pixels of an object pixel is calculated to determine whether the average lightness exceeds a reference value of the blacking lightness or the whitening lightness or not and subsequently the smoothing processing is performed based on the determination result. However, the determination processing for each pixel may cause an increase in the processing time at just that much. To prevent this, a second embodiment of the present invention previously sets a relation between the lightness and a smoothing strength that shows a smoothing degree depending on the lightness so that the determination processing can be avoided while providing the same effect as that by the first embodiment.

Figure 14:
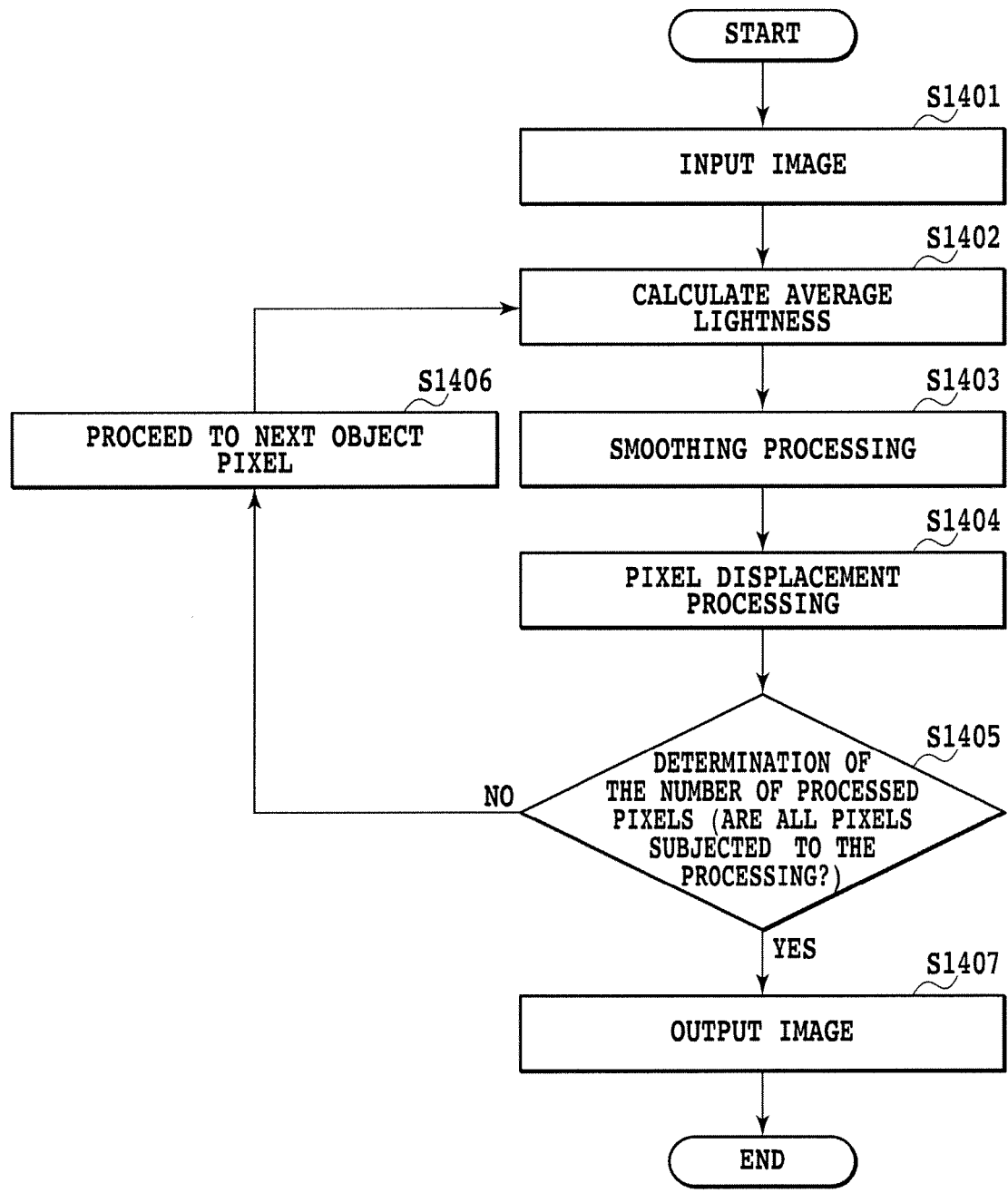
FIG. 14 is a flowchart illustrating the smoothing processing according to a second embodiment of the present invention.

FIG. 14 is a flowchart showing smoothing processing according to this embodiment. Steps 1401 and 1402 shown in FIG. 14 are the same processes as those of Steps 1101 and 1102 shown in FIG. 11 according to the first embodiment.

Step 1403 executes the smoothing processing. In this embodiment, the smoothing processing is executed with use of smoothing strengths that are previously determined depending on the lightness.

Figure 15A:
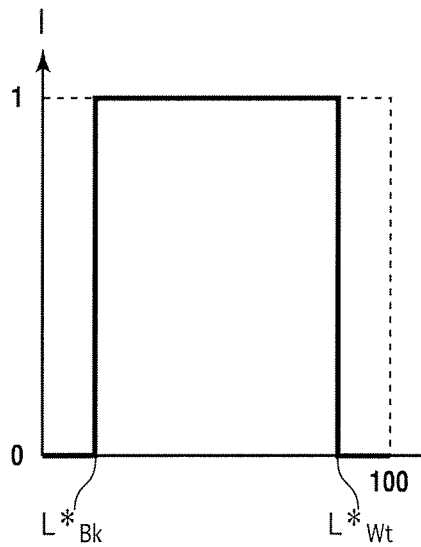
FIGS. 15A, 15B, and 15C are diagrams illustrating three examples of the smoothing strength according to the second embodiment.
Figure 15B:
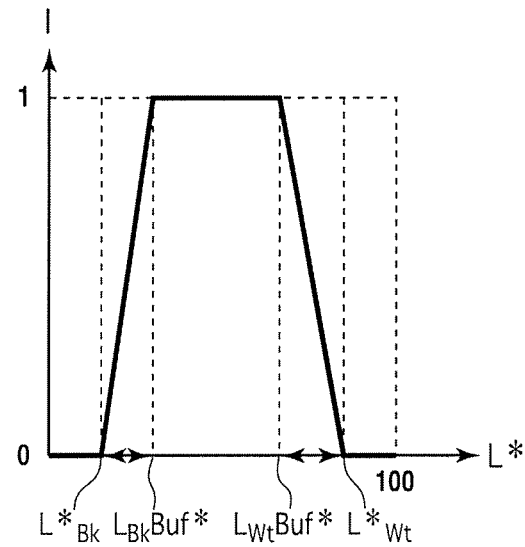
Figure 15C:
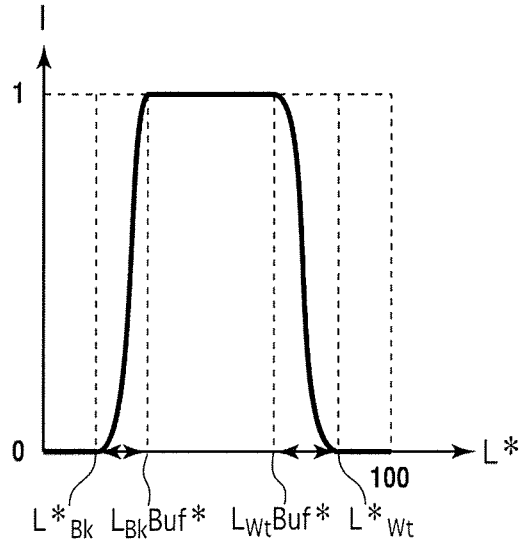

FIGS. 15A, 15B, and 15C are diagrams showing three examples of the smoothing strength. In FIGS. 15A, 15B, and 15C, the vertical axis represents a smoothing strength I and the horizontal axis represents the average lightness L* of the peripheral pixels of the object pixel. The smoothing strength I is in a range from 0 to 1.

In the example shown in FIG. 15A, when the average lightness LAVE* obtained through Step 1402 is equal to or lower than the blacking lightness L*Bk and is equal to or higher than the whitening lightness L*Wt, the smoothing strength is 0. When the average lightness LAVE* is between the blacking lightness L*Bk and the whitening lightness L*Wt, the smoothing strength is 1. This smoothing strength is adapted to prevent, as in the first embodiment, the object pixel having an average lightness equal to or lower than the blacking lightness L*Bk (or equal to or higher than the whitening lightness L*Wt) from being subjected to the smoothing processing. As a result, when the object pixel has a signal value higher than the blacking lightness, the signal value is conserved. This can prevent a pixel originally having a signal value having an average lightness higher than the blacking lightness L*Bk (or lower than the whitening lightness L*Wt) from being subjected to the gamut compression where the pixel is converted to the black point.

In the example shown in FIG. 15B, when the average lightness LAVE is equal to or lower than the blacking lightness L*Bk and is equal to or higher than the whitening lightness L*Wt, the smoothing is not performed as in the example shown in FIG. 15A (the smoothing strength is 0). On the other hand, a dark part from the blacking lightness L*Bk to the lightness LBkBuf* includes a buffer region. The purpose is to continuously change the smoothing strength in the buffer region in order to reduce a sudden change in the smoothing strength. The lightness LBkBuf* is set based on the following formula (2). In the formula, RATEBk shows a ratio of the buffer region of the dark part and is set to a value in a range from 0 to 1.

$$LBkBuf^* = (L^*Wt - L^*Bk) \times \text{RATE}Bk + L^*Bk \quad (2)$$

The smoothing strength of the dark part buffer regions is linearly increased from 0 to 1.

On the other hand, a buffer region of a bright part is provided between the whitening lightness L*Wt and the lightness LWtBu*. The lightness LWtBuf* can be calculated by using the following formula (3). RATEWt shows a ratio of the buffer region of the bright part and is set to a value in a range from 0 to 1.

$$LWtBuf^* = L^*Wt - (L^*Wt - L^*Bk) \times \text{RATE}Wt \quad (3)$$

In the bright part buffer region, the smoothing strength is reduced in proportion to 1 to 0 to buffer a sudden change.

It is noted that how to connect the smoothing strengths in the buffer region is not limited to this method and also may be connected by a smooth curve by using a quadratic function as shown in FIG. 15C.

After the smoothing strength I is obtained by the method as described above, the smoothing based on the following formula (4) is performed. First, an average RGB value of the peripheral pixels of the object pixel is calculated. This average RGB value is (RAVE, GAVE and BAVE). When the object pixel has a color signal (R, G, and B) and the value of the object pixel after the smoothing is (RSMG, GSMG, and BSMG), the following is established.

$$RSMG = RAVE \times I + R \times (1-I)$$
$$GSMG = GAVE \times I + G \times (1-I) \quad (4)$$
$$BSMG = BAVE \times I + B \times (1-I)$$

With reference to FIG. 14 again, the above-described averaging processing is followed by Step 1404 to displace the object pixel with the pixel value (RSMG, GSMG, and BSMG) after the smoothing. It is noted that, although this processing subjects all pixels to the displacement processing, the displacement processing also may not be carried out when the input pixel value and the pixel value after the smoothing have no change therebetween. Next, Step 1405 determines whether all pixels are subjected to the processes from Step 1402 to Step 1404 or not. When all pixels are subjected to the processes from Step 1402 to Step 1404, the above-described processes are repeated until all pixels are subjected to the processes from Step 1402 to Step 1404.

As described above, according to the second embodiment of the present invention, the pixel subjected to the smoothing can be reproduced with the same color regardless of the document type as shown in the first embodiment. The existence of a pixel not subjected to the smoothing can maintain a macroscopic gradation. In addition, a predetermined set relation between the average lightness of peripheral pixels of the object pixel and the smoothing strength can be used to perform an efficient processing.

Embodiment 3

A third embodiment of the present invention relates to smoothing processing that considers a gamut compression of a region other than regions subjected to the above-described blacking and the like. An uncompressed region in the gamut compression of this embodiment is set to be 100%.

Figure 16:
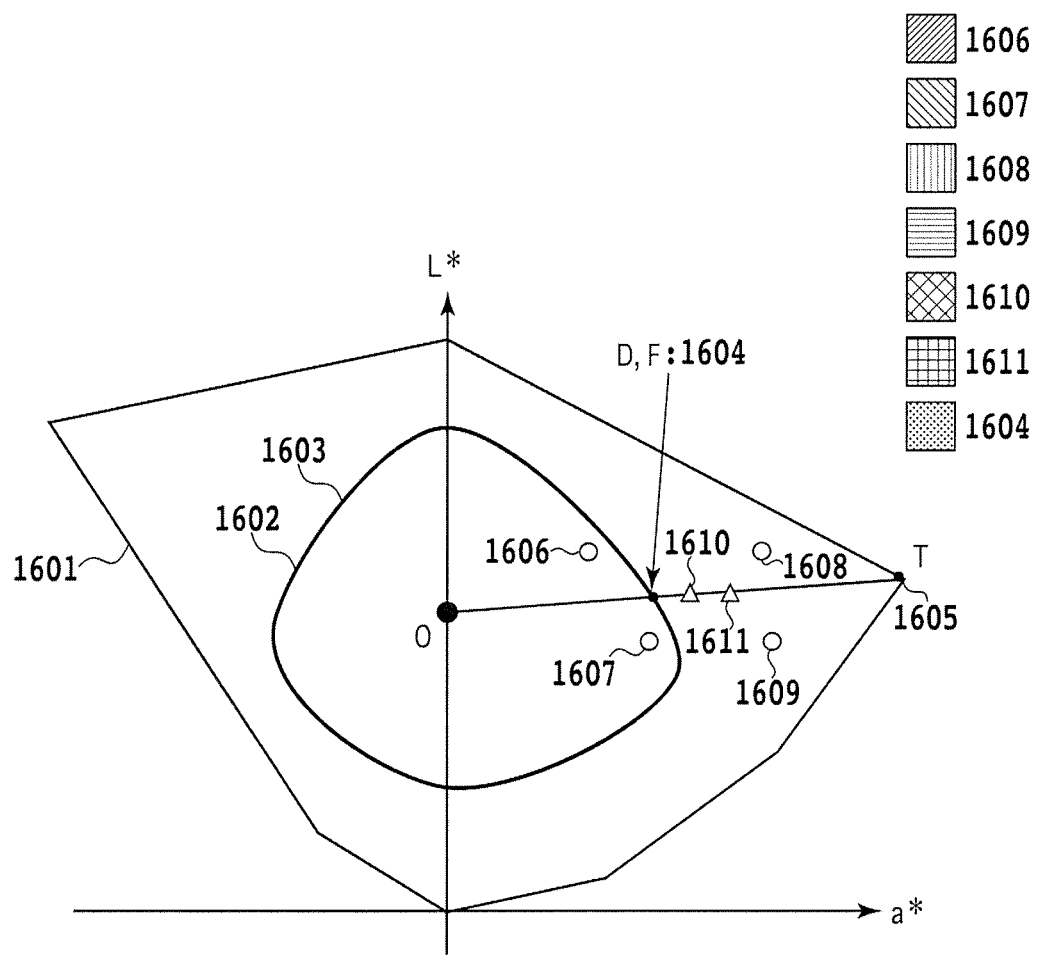
FIG. 16 is a diagram illustrating the gamut compression used in a third embodiment of the present invention.

FIG. 16 is a diagram illustrating the gamut compression when the uncompressed region is 100%. The color gamut 1601 and 1602 are obtained by projecting the color gamut of the sRGB color space as the standard color space and the printer color gamut to the L*a* plane, respectively. Since the uncompressed region is set to be 100%, the printer color gamut 1602 and the uncompressed region 1603 are in the same region. Thus, a point at which a compression line (line connecting O to T in the drawing) intersects with an outermost surface of the printer color gamut 1602 and the outline surface of the uncompressed region respectively is the same point 1604. Specifically, distances D and F are equal to each other. The point 1605 is a point at which the compression line intersects with the outermost surface of the color gamut 1601 of the standard color space. The distance is T.

Figure 17:
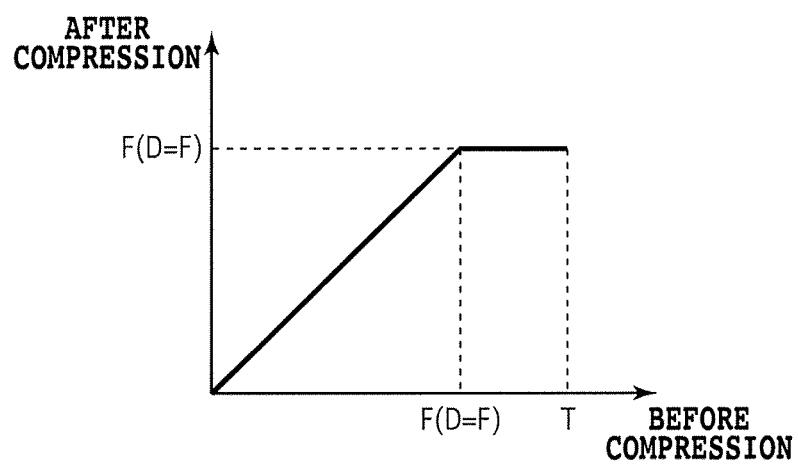
FIG. 17 is a diagram illustrating compressing in the gamut compression of the third embodiment.

For example, when lattice points determined in the standard color space is on a straight line (the compression line) connecting the point O and the point 1605 and the distance between the lattice point and the compression convergence point is equal to or lower than the distance F (D=F), the lattice points are mapped to original points without change. As a result, colorimetrically identical color reproduction can be achieved. Lattice points of distances that are longer than the distance D and equal to or shorter than the distance T are all mapped (or compressed) to the point of the distance F. FIG. 17 shows a relation between the distance before the gamut compression of the lattice points in the standard color space in this mapping (compression) and the distance after the compression.

Figure 18:
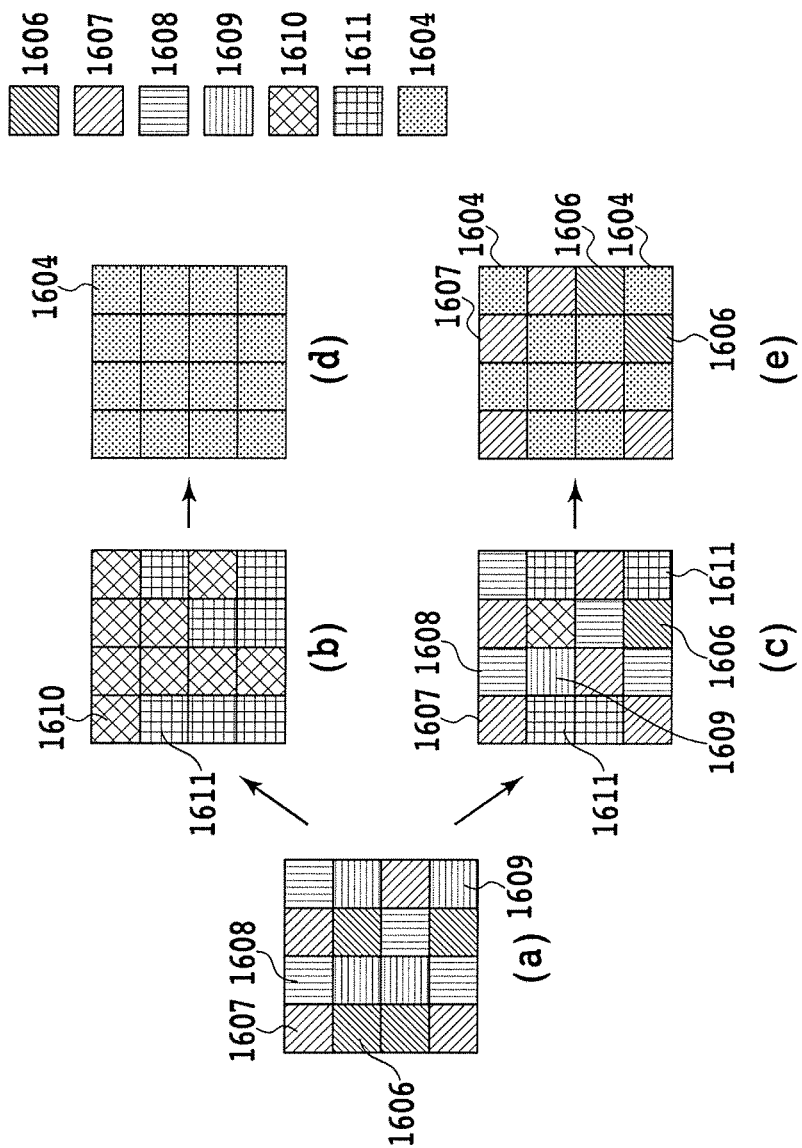
FIG. 18 is a diagram illustrating the smoothing processing according to the third embodiment and the effect thereof.

FIG. 18 is a diagram illustrating the smoothing processing according to this embodiment and the effect thereof.

In FIG. 18, a section (a) shows 4 pixels×4 pixels that are a part of image data given to the processing of Step 503 of FIG. 5. This image data is composed of pixels of colors 1606 to 1609 shown in FIG. 18. The upper right part of FIG. 18 schematically shows the respective colors.

When this image is uniformly subjected to the smoothing processing, an image after the smoothing processing is obtained as shown in a section (b) of FIG. 18. Specifically, the image composed of pixels of the colors 1610 and 1611 is obtained. When the data after the smoothing is subjected to the output device color conversion processing (Step 505) based on the gamut compression method described in FIG. 16, the points 1610 and 1611 are on a single straight line from the compression convergence point and thus every point (colors) is compressed to the position of the point 1604. Specifically, every point (color) is reproduced with the same color in the outermost surface of the printer color gamut 1602. A section (d) of FIG. 18 shows the image data after this output device color conversion processing. As shown in the section (d) of FIG. 18, all pixels are converted to the same color and the gradation characteristic is deteriorated.

To solve this, in this embodiment, a smoothing method based on the distances between the average color of the peripheral pixels of the object pixel and the compression convergence point is carried out. First, when the output profile is prepared, the relation between the RGB value of the lattice point of the standard color space and the smoothing strength I is calculated and is stored in a lookup table form. The smoothing strength I is calculated based on the following method.

Then, the distance T' between the outermost surface of the color gamut 1601 in the standard space and the compression convergence point O are calculated. Next, the distance D' between the outline surface of the printer color gamut 1602 and the compression convergence point O is calculated. Then, the distance X' the compression convergence point O to the lattice point is calculated. Based on this distance, the smoothing strength is determined.

Figure 19A:
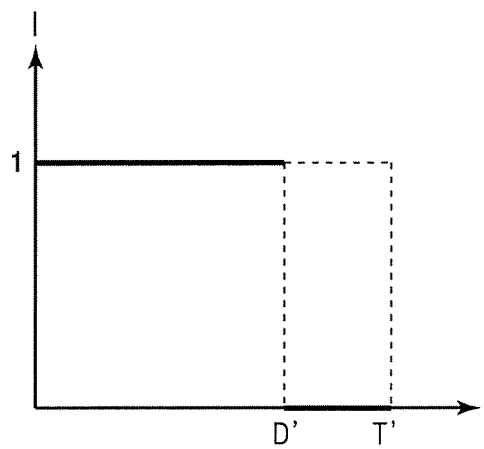
FIGS. 19A and 19B are diagrams illustrating examples of the smoothing strength in the smoothing processing according to the third embodiment, respectively.
Figure 19B:
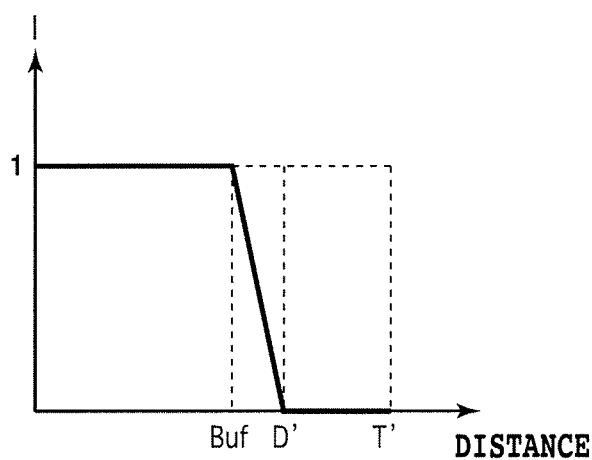

FIG. 19A is a diagram showing an example of the smoothing strength. As shown in FIG. 19A, the smoothing strength I is set in a range from 0 to 1. In the shown example, when the distance X' is equal to or longer than the distance D' and is equal to or shorter than the distance T', the smoothing strength is determined to be 0. As shown in FIG. 19B, 80% distance of the distance D' may be Buf and the smoothing strength between the distance Buf and the distance D' may be linearly connected so as to improve the continuousness of the smoothing strength. When the distance of the lattice point is between the distance Buf and the distance D', the following formula (5) can be used to calculate the smoothing strength.

$$I = 1/(Buf-D') \times X' - D'/(Buf-D') \qquad (5)$$

It is noted that a function connecting the distance Buf to the distance D in FIG. 19B is not limited to the formula (5) and may be connected by a quadratic function for example.

Figure 20:
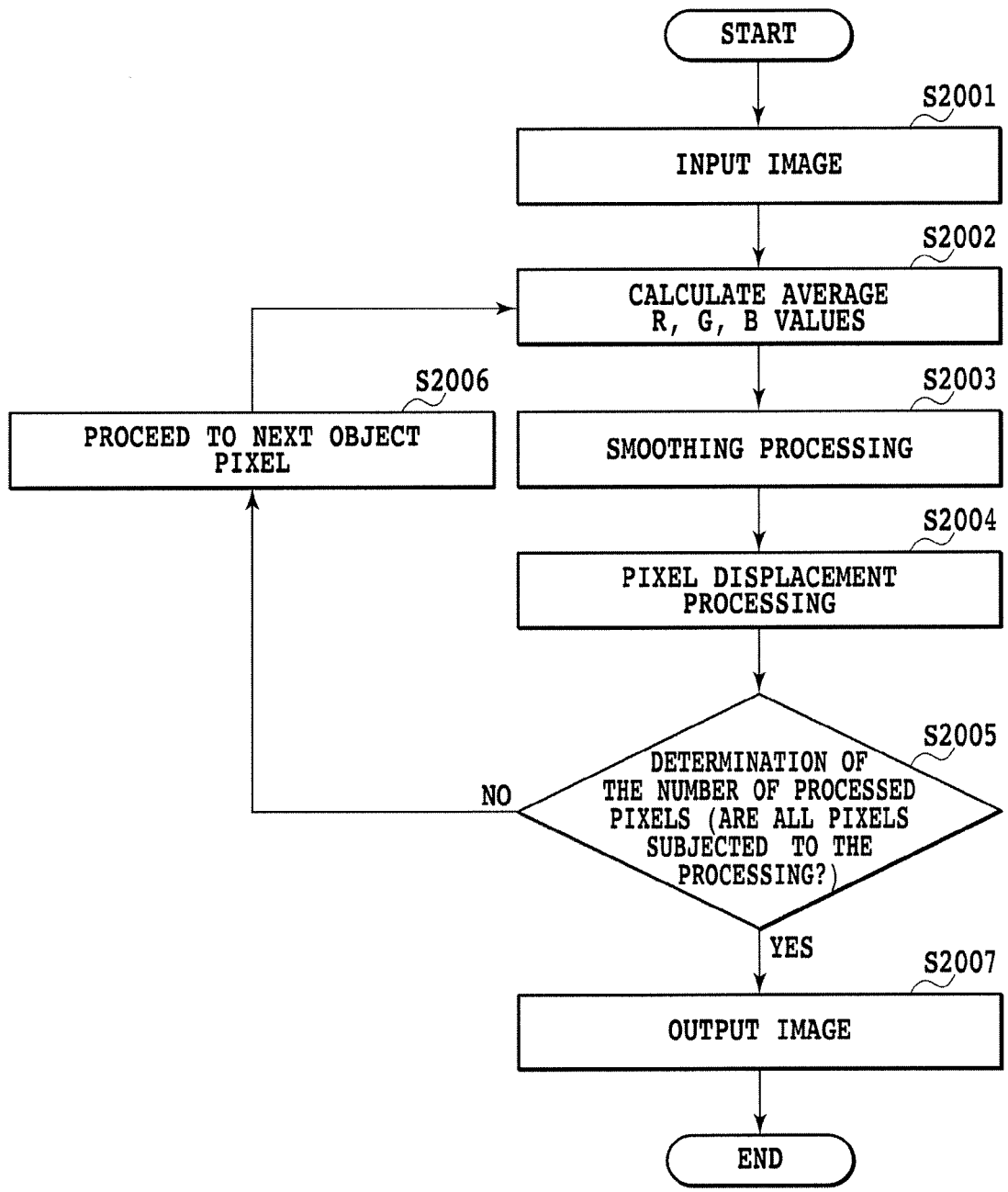
FIG. 20 is a flowchart illustrating the smoothing processing according to the third embodiment.

FIG. 20 is a flowchart showing smoothing processing according to this embodiment. Step 2001 is the same processing as those of the above-described Embodiments 1 and 2. Step 2002 calculates an average RGB value of the peripheral pixels of the object pixel. This average RGB value is represented by (RAVE, GAVE, and BAVE).

Next, Step 2003 calculates the smoothing strength for the average RGB value of the peripheral pixels of the object pixel. More specifically, in accordance with the position of a point in the color gamut of the L*a*b* color coordinate system shown in FIG. 16, which point corresponds to the average value of respective RGB values of 7 pixels×7 pixels including the object pixel and surrounding pixels, the smoothing strength is calculated based on the relation of FIG. 19A or 19B. Specifically, the smoothing strength is calculated by using the lookup table showing the relation of the smoothing strength I to the RGB value of the lattice point of the standard color space stored during the gamut compression. This table can be obtained, based on the smoothing strength of the L*a*b* color coordinate system shown in FIG. 19A or 19B, for example, by the interpolating processing shown in Japanese Patent Laid-Open No. 2000-022973. Next, the smoothing strength, the RGB value of the object pixel, and the average RGB value are substituted to the formula (4) shown in Step 1403 of the Embodiment 2 to carry out the smoothing. Then, the processing proceeds to Step 2004. The processes after Step 2004 are the same as those of the Embodiment 2.

According to the embodiment described above, the smoothing processing is performed by using the smoothing strength I calculated based on the average RGB value of the peripheral pixels of the object pixel. Specifically, the smoothing processing is not performed when the average RGB value of the peripheral pixels of the object pixel exists out of the printer color gamut and thus the smoothing strength is 0. In FIG. 18, the section C shows image data which has been subjected to the smoothing processing according to this embodiment. As shown in the section (c) of FIG. 18, a pixel exists for which the smoothing processing is not performed and thus the pixel value of the input image is directly conserved without change. In FIG. 18, the section (e) shows image data obtained by subjecting the image data after the smoothing processing to the output device conversion processing (Step 505 of FIG. 5). As shown in the section (e) of FIG. 18, the object pixel having smoothing strength of 0 depending on the average RGB value is not subjected to the smoothing processing and thus the signal value of the object pixel is conserved without change. This can prevent the object pixel having the average RGB value of the peripheral pixels which is out of the printer color gamut from being converted into the same pixel in the subsequent gamut compression due to the smoothing processing. On the other hand, when the object pixel existing in the printer color gamut is not subjected to the smoothing processing, the original color is reproduced without change. For example, when the object pixel is out of the printer color gamut as in the case of the point 1608, the color of this point is reproduced as a color of a point at which a line connecting the point 1608 and the compression convergence point O intersects with the outermost surface of the printer color gamut. As a result, a deteriorated gradation characteristic as shown in the section (d) of FIG. 18 can be prevented. Furthermore, the color in the printer color gamut is subjected to a calorimetrically identical color reproduction and thus the points 1606 and 1607 shown in FIG. 16 have no change. Specifically, the smoothing is carried out, pixel data exists which is subjected to the calorimetric color reproduction, and the gradation characteristic is maintained when this image data is macroscopically observed.

Other Embodiments

It is noted that the present invention is not limitedly applied to the gamut compression of the above-described embodiments. For example, the invention also may be applied to a case where a gamut mapping of any other forms is carried out such as a case where the color gamut of the input color space is different from the shape of the color gamut of the output color space and the gray scale of the input color space is compressed.

The term "smoothing" may be interpreted as including any processing for averaging pixel values in the application of the present invention, as is clear from the above description.

Although the above-described respective embodiments relate to an embodiment where a multi-function printer carries out the image processing of the present invention, the present invention is not limited to this embodiment. For example, a PC also may carry out the image processing of the above-described respective embodiments. Alternatively, a printer having only a general printing function also may carry out the image processing of the above-described respective embodiments. The respective apparatuses for carrying out these image processing constitute an image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-093550, filed Mar. 30, 2007, which is hereby incorporated by reference herein in its entirety.

What is claimed is:

1. An image processing apparatus comprising:
a correcting unit constructed to correct signal value of a target pixel in an image based on a signal value of a pixel positioned around the target pixel in the image in a first color space;
a converting unit constructed to convert a signal value of a pixel of the image corrected by the correcting unit in the first color space to a pixel value in a second color space;
wherein the correcting unit changes a degree of correcting the signal value of the target pixel based on the signal value of the pixel positioned around the target pixel, based on a color in a color gamut of the second color space.

2. An image processing apparatus as claimed in claim 1, wherein the correcting unit corrects the signal value of the target pixel so as to be changed into a pixel value obtained by a predetermined rule based on signal values of a plurality of pixels comprising the target pixel and a pixel arranged at a peripheral position of a position of the target pixel.

3. An image processing apparatus as claimed in claim 2, wherein the correcting unit corrects the signal value of the target pixel so as to be changed into an average value of signal values of a plurality of pixels comprising the target pixel and a pixel arranged at a peripheral position of a position of the target pixel.

4. An image processing apparatus as claimed in claim 1, wherein the signal value shows lightness and when the lightness shown by the signal value of the pixel is lower than a first lightness, the conversion unit converts the signal value of the pixel to a signal value showing the first lightness.

5. An image processing apparatus as claimed in claim 4, wherein the first lightness is the lowest lightness shown by a color in the second color space.

6. An image processing apparatus as claimed in claim 1, wherein the signal value shows a lightness and when the lightness shown by the signal value of the pixel is higher than a second lightness, the conversion unit converts the signal value of the pixel to a signal value showing the second lightness.

7. An image processing apparatus as claimed in claim 6, wherein the second lightness is the highest lightness shown by a color in the second color space.

8. An image processing apparatus as claimed in claim 4, when a lightness shown by a pixel value obtained by a predetermined rule based on signal values of a plurality of pixels comprising the target pixel and a pixel around the target pixel is lower than the first lightness, the correcting unit does not correct the signal value of the target pixel.

9. An image processing method comprising:
a correcting step of correcting signal value of a target pixel in an image based on a signal value of a pixel positioned around the target pixel in the image in a first color space;

a converting step of converting a signal value of a pixel of the image corrected by the correcting step in the first color space to a pixel value in a second color space;

wherein the correcting step changes a degree of correcting the signal value of the target pixel based on the signal value of the pixel positioned around the target pixel, based on a color in a color gamut of the second color space.

10. An image processing method as claimed in claim 9, wherein the correcting step corrects the signal value of the target pixel so as to be changed into a pixel value obtained by a predetermined rule based on signal values of a plurality of the pixels comprising the target pixel and a pixel arranged at a peripheral position of a position of the target pixel.

11. An image processing method as claimed in claim 10, wherein the correcting step corrects the signal value of the target pixel so as to be changed into an average value of signal values of a plurality of the pixels comprising the target pixel and a pixel arranged at a peripheral position of a position of the target pixel.

12. An image processing method as claimed in claim 9, wherein the signal value shows lightness and when the lightness shown by the signal value of the pixel is lower than a first lightness, the conversion step converts the signal value of the pixel to a signal value showing the first lightness.

13. An image processing method as claimed in claim 12, wherein the first lightness is the lowest lightness shown by a color in the second color space.

14. An image processing method as claimed in claim 9, wherein the signal value shows a lightness and when the lightness shown by the signal value of the pixel is higher than a second lightness, the conversion step converts the signal value of the pixel to a signal value showing the second lightness.

15. An image processing method as claimed in claim 14, wherein the second lightness is the highest lightness shown by a color in the second color space.

16. An image processing method as claimed in claim 12, when a lightness shown by the pixel value obtained by a predetermined rule based on signal values of a plurality of the pixels comprising the target pixel and a pixel around the target pixel is lower than the first lightness, the correcting step does not correct the signal value of the target pixel.

17. A non-transitory computer-readable storage medium retrievably storing a program that causes a computer to function as an image processing apparatus comprising:

a correcting unit constructed to correct signal value of a target pixel in an image based on a signal value of a pixel positioned around the target pixel in the image in a first color space;

a converting unit constructed to convert a signal value of a pixel of the image corrected by the correcting unit in the first color space to a pixel value in a second color space;

wherein the correcting unit changes a degree of correcting the signal value of the target pixel based on the signal value of the pixel positioned around the target pixel, based on a color in a color gamut of the second color space.

18. An image processing apparatus comprising:

a correcting unit constructed to correct signal value of a target pixel in an image based on a signal value of a pixel positioned around the target pixel in the image in a first color space so as to be changed into an average value of signal values of a plurality of pixels in a predetermined region of the image comprising the target pixel and a peripheral pixel arranged at a peripheral position of a position of the target pixel; and a converting unit constructed to convert a signal value of a pixel of the image corrected by the correcting unit in the first color space to a pixel value in a second color space, wherein when the lightness shown by the signal value of the pixel is lower than a first lightness, the conversion unit converts the signal value of the pixel to a first predetermined signal value representing the first lightness and when the lightness shown by the signal value of the pixel is higher than a second lightness, the conversion unit converts the signal value of the pixel to a second predetermined signal value representing the second lightness, wherein the correcting unit changes a degree of correcting the signal value of the target pixel based on an information representing an average of lightness of a plurality of pixels in the predetermined region.

19. An image processing apparatus as claimed in claim 18, wherein the first lightness is the lowest lightness shown by a color in the second color space, and the second lightness is the highest lightness shown by a color in the second color space.

20. An image processing apparatus as claimed in claim 18, wherein when the lightness shown by the signal value of the pixel is lower than the first lightness or when the lightness shown by the signal value of the pixel is higher than the second lightness, the correcting unit does not correct the signal value of the target pixel.

21. An image processing method comprising:

a correcting step of correcting signal value of a target pixel in an image based on a signal value of a pixel positioned around the target pixel in the image in a first color space so as to be changed into an average value of signal values of a plurality of pixels in a predetermined region of the image comprising the target pixel and a peripheral pixel arranged at a peripheral position of a position of the target pixel; and a converting step of converting a signal value of a pixel of the image corrected by the correcting step in the first color space to a pixel value in a second color space, wherein when the lightness shown by the signal value of the pixel is lower than a first lightness, the conversion step converts the signal value of the pixel to a first predetermined signal value representing the first lightness and when the lightness shown by the signal value of the pixel is higher than a second lightness, the conversion step converts the signal value of the pixel to a second predetermined signal value representing the second lightness, wherein the correcting step changes a degree of correcting the signal value of the target pixel based on an information representing an average of lightness of a plurality of pixels in the predetermined region.

22. An image processing method as claimed in claim 21, wherein the first lightness is the lowest lightness shown by a color in the second color space, and the second lightness is the highest lightness shown by a color in the second color space.

23. An image processing method as claimed in claim 21, wherein when the lightness shown by the signal value of the pixel is lower than the first lightness or when the lightness shown by the signal value of the pixel is higher than the second lightness, the correcting step does not correct the signal value of the target pixel.

24. A non-transitory computer-readable storage medium retrievably storing a program that causes a computer to function as an image processing apparatus comprising:

a correcting unit constructed to correct signal value of a target pixel in an image based on a signal value of a pixel positioned around the target pixel in the image in a first color space so as to be changed into an average value of signal values of a plurality of pixels in a predetermined region of the image comprising the target pixel and a peripheral pixel arranged at a peripheral position of a position of the target pixel; and a converting unit constructed to convert a signal value of a pixel of the image corrected by the correcting unit in the first color space to a pixel value in a second color space, wherein when the lightness shown by the signal value of the pixel is lower than a first lightness, the conversion unit converts the signal value of the pixel to a first predetermined signal value representing the first lightness and when the lightness shown by the signal value of the pixel is higher than a second lightness, the conversion unit converts the signal value of the pixel to a second predetermined signal value representing the second lightness, wherein the correcting unit changes a degree of correcting the signal value of the target pixel based on an information representing an average of lightness of a plurality of pixels in the predetermined region.

25. A non-transitory computer-readable storage medium as claimed in claim 24, wherein the first lightness is the lowest lightness shown by a color in the second color space, and the second lightness is the highest lightness shown by a color in the second color space.

26. A non-transitory computer-readable storage medium as claimed in claim 24, wherein when the lightness shown by the signal value of the pixel is lower than the first lightness or when the lightness shown by the signal value of the pixel is higher than the second lightness, the correcting unit does not correct the signal value of the target pixel.

* * * * *